(12) United States Patent
Harvey et al.

(10) Patent No.: US 7,509,377 B2
(45) Date of Patent: Mar. 24, 2009

(54) SYSTEM AND METHOD FOR COMMUNICATING IMAGES BETWEEN INTERCOMMUNICATING USERS

(75) Inventors: Christopher Forrest Harvey, San Francisco, CA (US); Matthew New, Santa Clara, CA (US); Ramkumar Ramani, San Jose, CA (US)

(73) Assignee: Yahoo! Inc., Sunnyvale, CA (US)

( * ) Notice: Subject to any disclaimer, the term of this patent is extended or adjusted under 35 U.S.C. 154(b) by 546 days.

(21) Appl. No.: 10/609,183

(22) Filed: Jun. 26, 2003

(65) Prior Publication Data

US 2005/0033806 A1 Feb. 10, 2005

Related U.S. Application Data

(60) Provisional application No. 60/392,174, filed on Jun. 26, 2002.

(51) Int. Cl.
*G06F 15/16* (2006.01)

(52) U.S. Cl. .................. 709/206; 709/203; 709/204; 709/217; 709/225; 709/236

(58) Field of Classification Search .................. 709/204, 709/203, 217, 225, 206
See application file for complete search history.

(56) References Cited

U.S. PATENT DOCUMENTS

| 5,819,048 A | * | 10/1998 | Okazaki et al. ............. 709/233 |
| 5,832,300 A | * | 11/1998 | Lowthert ..................... 710/33 |
| 5,956,716 A | | 9/1999 | Kenner et al. |
| 6,377,989 B1 | * | 4/2002 | Fukasawa et al. ........... 709/224 |
| 6,545,697 B1 | * | 4/2003 | Parker et al. ............. 348/14.01 |
| 6,677,976 B2 | * | 1/2004 | Parker et al. ............. 348/14.08 |
| 2002/0126135 A1 | * | 9/2002 | Ball et al. .................. 345/600 |
| 2002/0130904 A1 | | 9/2002 | Becker et al. |
| 2003/0074451 A1 | | 4/2003 | Parker et al. |
| 2003/0225846 A1 | | 12/2003 | Heikes et al. |
| 2004/0008635 A1 | * | 1/2004 | Nelson et al. ............... 370/260 |

FOREIGN PATENT DOCUMENTS

WO   WO 01/10128   2/2001

(Continued)

OTHER PUBLICATIONS

PCT International Search Report dated Jul. 20, 2004 for International Application No. PCT/US03/20446.

(Continued)

*Primary Examiner*—Yves Dalencourt
(74) *Attorney, Agent, or Firm*—James J. DeCarlo; Greenberg Traurig, LLP

(57) ABSTRACT

An embodiment of the present invention for passing, by one or more application servers, images from a broadcaster computer to a first viewer computer may include receiving a request to initiate one or more server connections between the broadcaster computer and the first viewer computer. The connections being for passing an image and an instant message. The method also includes facilitating a peer-to-peer connection between the broadcaster computer and the first viewer computer. The peer-to-peer connection being for passing the image. The method also includes facilitating communication of an image over the peer-to-peer connection instead of the server connections, thereby conserving bandwidth of the servers.

19 Claims, 31 Drawing Sheets

FOREIGN PATENT DOCUMENTS

| WO | WO 01/72055 A | 9/2001 |
|---|---|---|
| WO | WO 01/77853 A | 10/2001 |
| WO | WO 01/93503 A | 12/2001 |
| WO | WO 02/09437 A | 1/2002 |
| WO | WO-2004/004139 A2 | 1/2004 |

OTHER PUBLICATIONS

PCT International Preliminary Examination Report dated Apr. 25, 2005 for International Application No. PCT/US2003/020446.
Supplementary Partial European Search Report (EP 03 74 2302).
Supplementary European Search Report (EP 03742302.7).

* cited by examiner

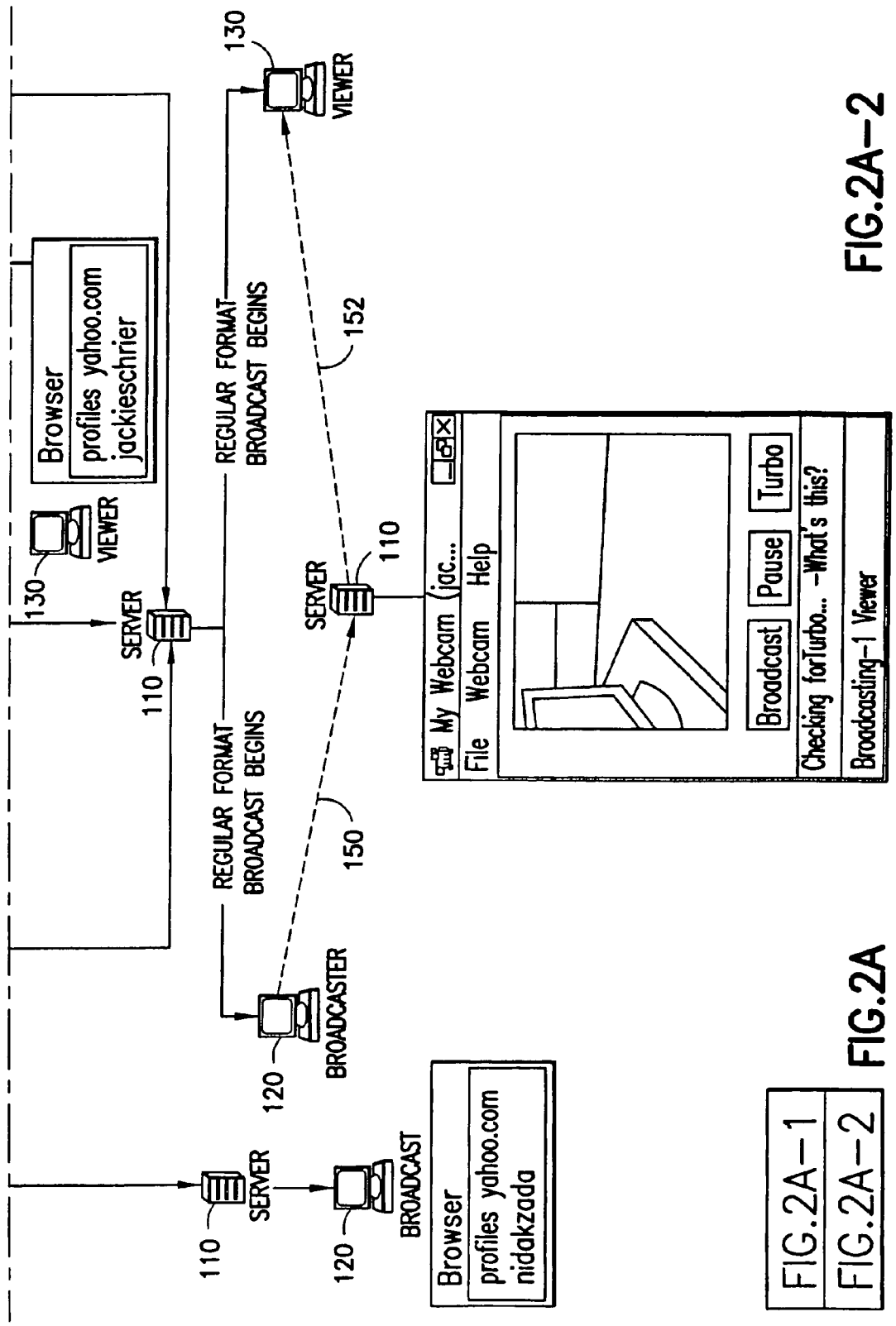

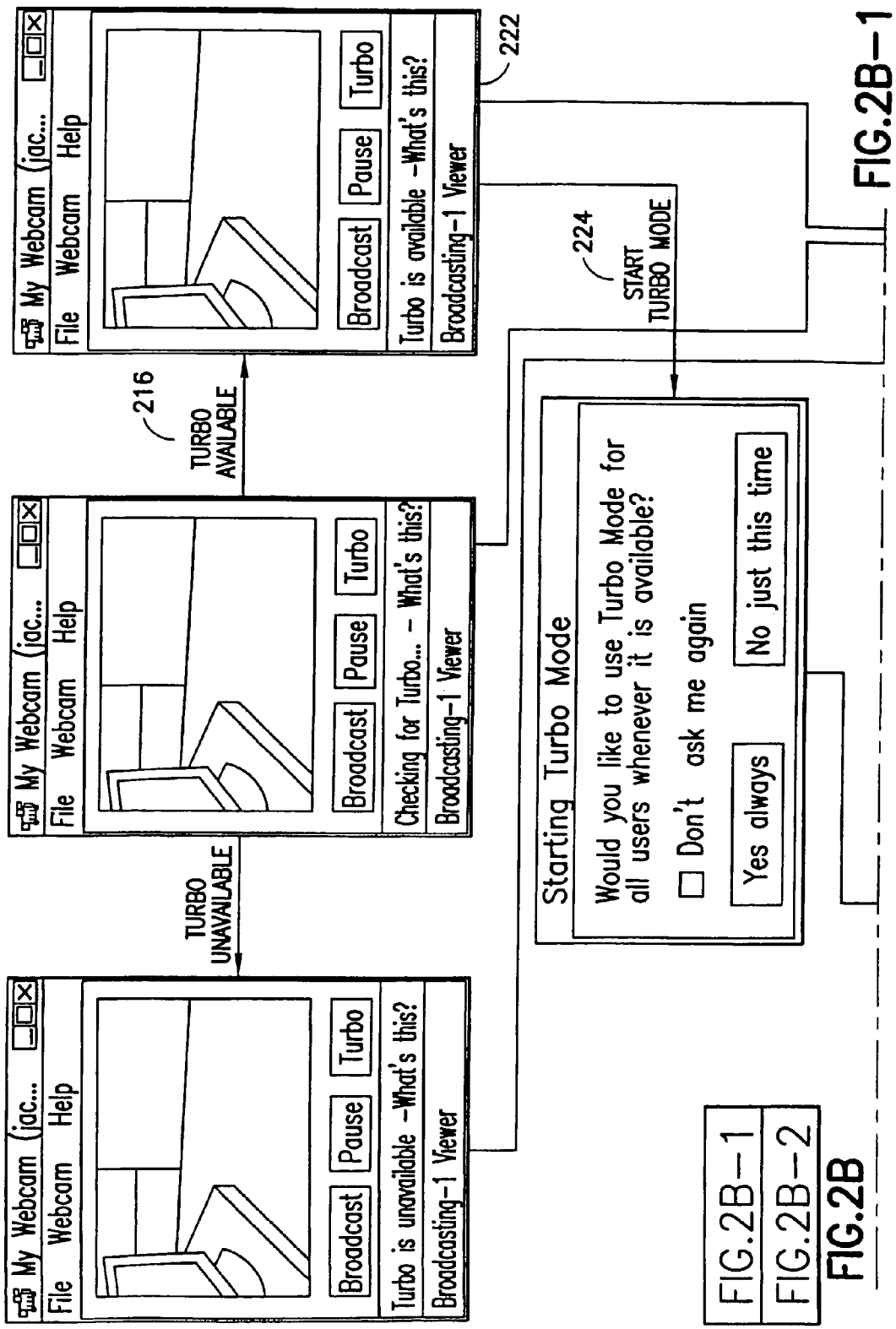

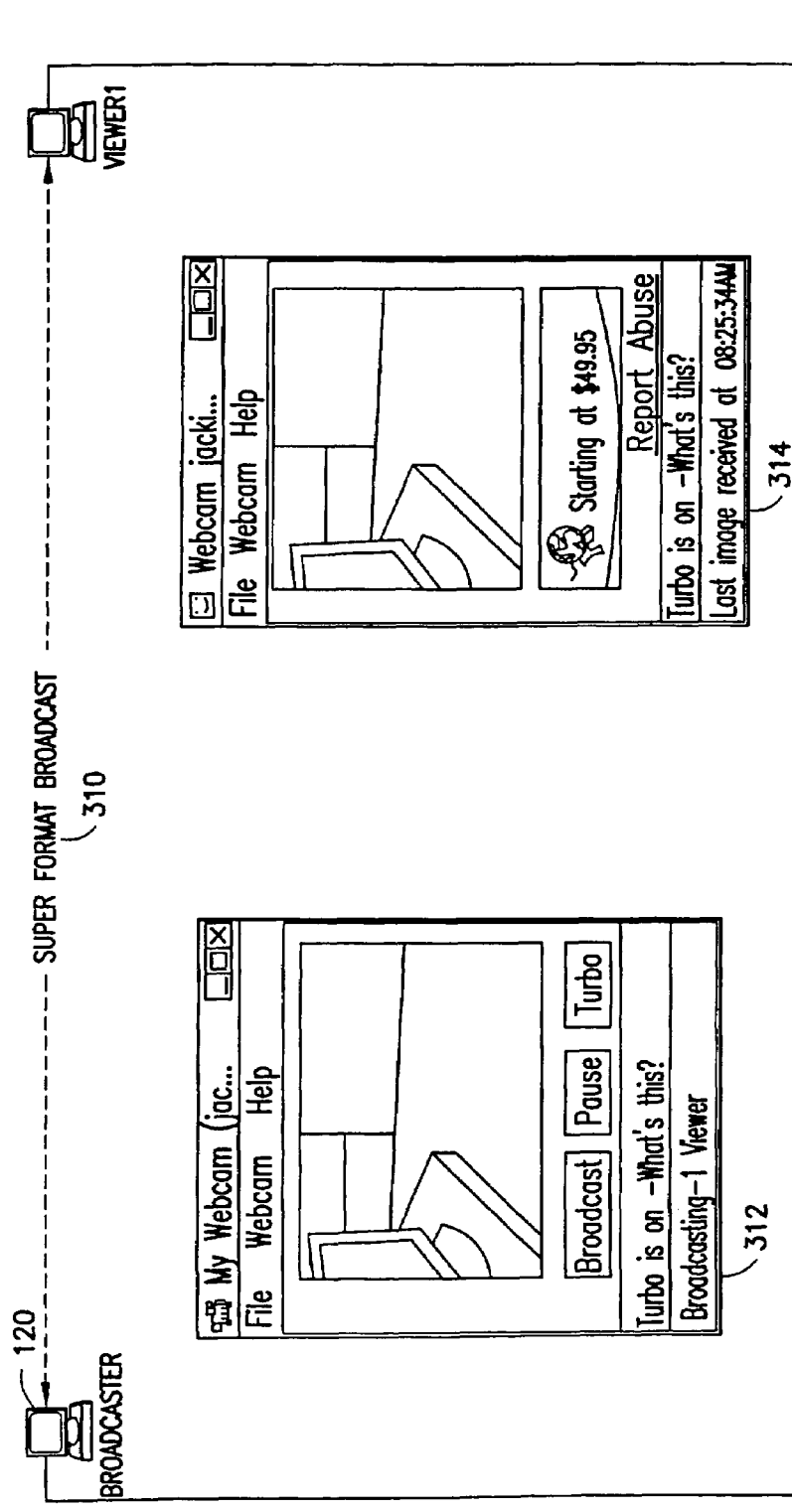
FIG.3A-1
FIG.3A
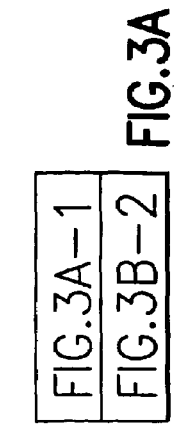

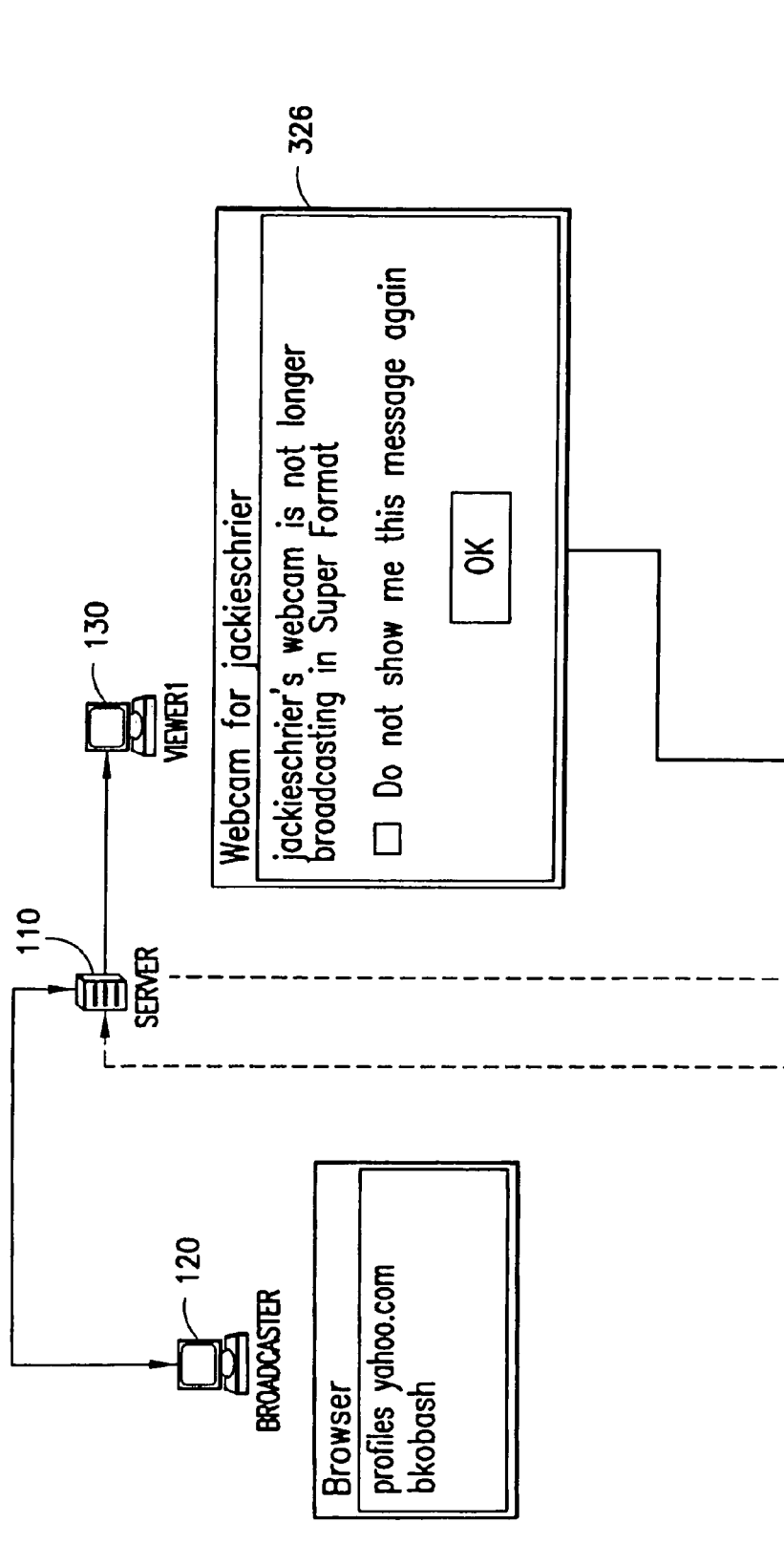

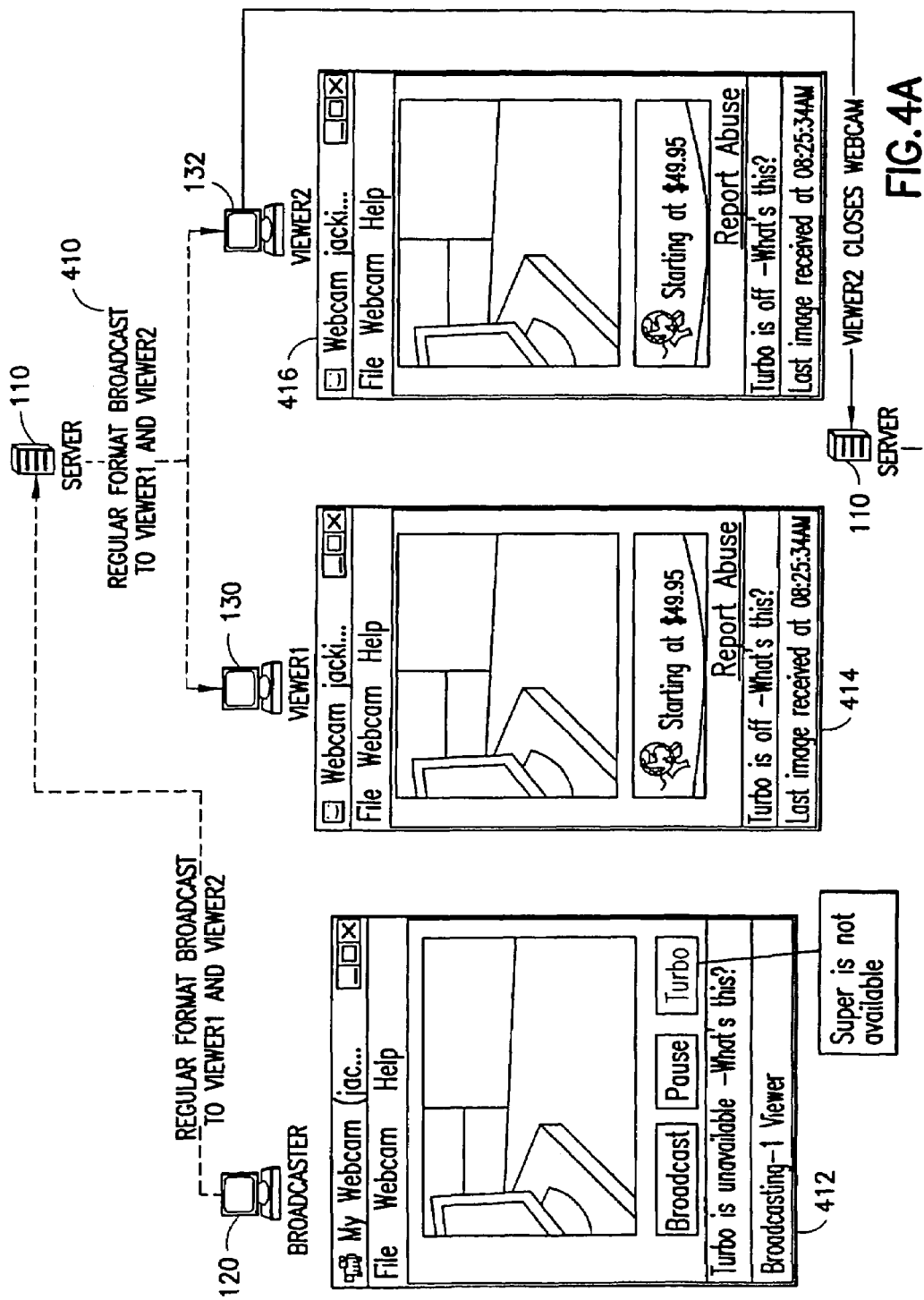

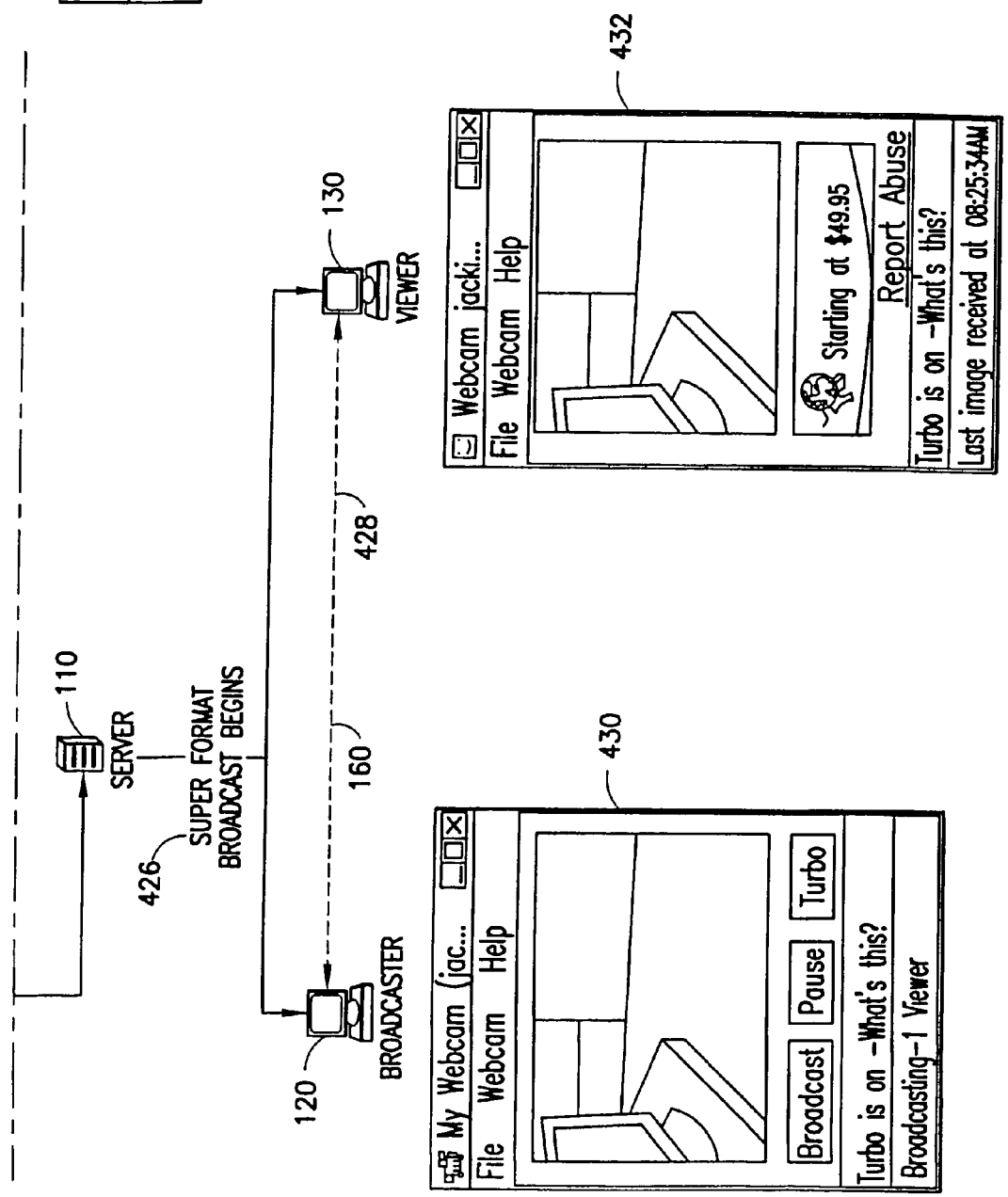

SYSTEM AND METHOD FOR COMMUNICATING IMAGES BETWEEN INTERCOMMUNICATING USERS

CROSS-REFERENCE TO RELATED APPLICATION

This application claims the benefit of U.S. Provisional Patent Application No. 60/392,174, filed Jun. 26, 2002, entitled "System and Method for Transmitting Images Between Intercommunicating Users," which is incorporated by reference herein.

BACKGROUND OF THE INVENTION

1. Field of the Invention

The invention relates to the field of transmitting information over communication networks, and more particularly, to a system and method for communicating images between intercommunicating users.

2. Description of Related Art

Increasingly, people are choosing to communicate with each other via computer networks, such as the Internet. Popular forms of communicating over the Internet include e-mail and chat rooms. Recently, instant messaging has become a popular format for communicating over the Internet. Instant messaging is a type of communication service that enables a user to carry on an electronic "conversation" with another individual, and to maintain personal or private lists of persons that the user communicates with frequently. Typically, the instant messaging system alerts the user whenever somebody on his or her private list is online. Then, the user can initiate a conversation session with that particular individual in a near real-time manner by typing messages and reading typed responses.

A deficiency of many instant messaging systems is that, because instant messaging is generally a text-based system, a user cannot see the person that the user is communicating with. Without any visual contact, it is difficult to communicate emotions or understand messages as easily as if, for example, one could observe the facial expressions of the person one is communicating with. Furthermore, without seeing the person, the identity of the person cannot be confirmed. Accordingly, while instant messaging is a popular means of communicating, it is, in some respects, an unnatural and awkward form of communication.

Video conferencing has existed for some time, but its use has not been largely popular for various reasons. Generally, video conferencing is a system whereby an uploader or broadcaster (person sending an image) uses a camera or other such image capture device to send his image to one or more viewers (person or persons receiving and viewing the image). By its nature, video conferencing tends to demand larger resources (network transport resources (e.g., bandwidth) and/or processing and equipment resources at the end user) and is more complex than, for example, text or audio based systems. This relatively large use of resources and bandwidth makes use of video conferencing difficult, especially for the typical home computer user, who may have a dial-up or other relatively slow (low bandwidth) Internet connection.

A variety of systems have been created in an attempt to overcome these deficiencies. Some simple systems involve sending an image to a central server through a standard protocol, such as FTP, at regular intervals of time, while a similar system at the receiving end grabs the images at periodic intervals from the central server for viewing. Such systems have the overhead of making and breaking a connection for every single image frame processed. Furthermore, these systems cannot synchronize an uploader system and a viewer system, nor can they perform intelligent optimization since there is no dedicated connection. Examples of such systems are the ones offered by spotlife (http://www.spotlife.com/), and Earthcam TV (http://tv.earthcam.com/).

Other publicly available video conferencing systems, such as Microsoft's NetMeeting (http://www.microsoft.com/windows/netmeeting/), are more complex. NetMeeting allows one-on-one video conferencing essentially through a peer-to-peer connection only. A central server is used only for the purpose of determining a user location and is optional. Another example of a similar system is CuSeeme (http://www.cuseeme.com/).

Another shortcoming of these systems is that they may limit bandwidth for a single viewer session or limit the number of viewer sessions. Such systems may be subject to relatively large costs and may be open to attacks from hackers who may try to break or disrupt a video conferencing system by uploading or viewing a large number of images.

Another shortcoming of known systems is that they may reduce their performance to the lowest common denominator, that is, images can be served only as fast as the slowest viewer can receive them. As such, a need exists for an improved system and method for transmitting images.

SUMMARY OF THE INVENTION

The present invention satisfies these and other needs, as will be apparent from the teachings herein. Various embodiments of the present invention taught herein provide for a system and method that allows for the communication of images between two or more users connected to a network, under the supervision and control of a Webcam service provider, a Webcam being a device at a user location that captures images of a user for transmission over a communication network. In one embodiment, the present invention allows users to transmit images in conjunction with instant messaging sessions.

Generally, according to an exemplary embodiment of the present invention, a Webcam server may be, for example, a central hub that receives images from broadcaster computers and transmits those images to viewer computers.

In an embodiment of the invention, the system may incorporate a peer-to-peer component as well as a central server component. In such an embodiment, a broadcaster computer may transmit images to a single viewer computer via a peer-to-peer connection. If, however, multiple viewer computers join the Webcam session, or if the peer-to-peer connection is lost, the broadcaster computer may transmit images to a viewer computer(s) via the Webcam server.

An embodiment of the present invention for passing, by one or more application servers, images from a broadcaster computer to a first viewer computer may include receiving a request to initiate one or more server connections between the broadcaster computer and the first viewer computer. The connections being for passing an image and an instant message. The method also includes facilitating a peer-to-peer connection between the broadcaster computer and the first viewer computer. The peer-to-peer connection being for passing the image. The method also includes facilitating communication of an image over the peer-to-peer connection instead of the server connections, thereby conserving bandwidth of the servers.

Other objects and features of the present invention will become apparent from the following detailed description, considered in conjunction with the accompanying drawing figures. It is understood, however, that the drawings are designed solely for the purpose of illustration and not as a definition of the limits of the invention, for which reference should be made to the appended claims.

BRIEF DESCRIPTION OF THE DRAWING FIGURES

In the drawing figures, which are not to scale, and which are merely illustrative, and wherein like reference numerals depict like elements throughout the several views:

FIGS. 4A and 4B are flow diagrams of a process of the second viewer leaving a viewing session with the broadcaster and first viewer of FIGS. 3A and 3B;

DETAILED DESCRIPTION OF THE EXEMPLARY EMBODIMENTS

There will now be shown and described in connection with the attached drawing figures several exemplary embodiments of a system and method for transmitting images.

Figure 1:
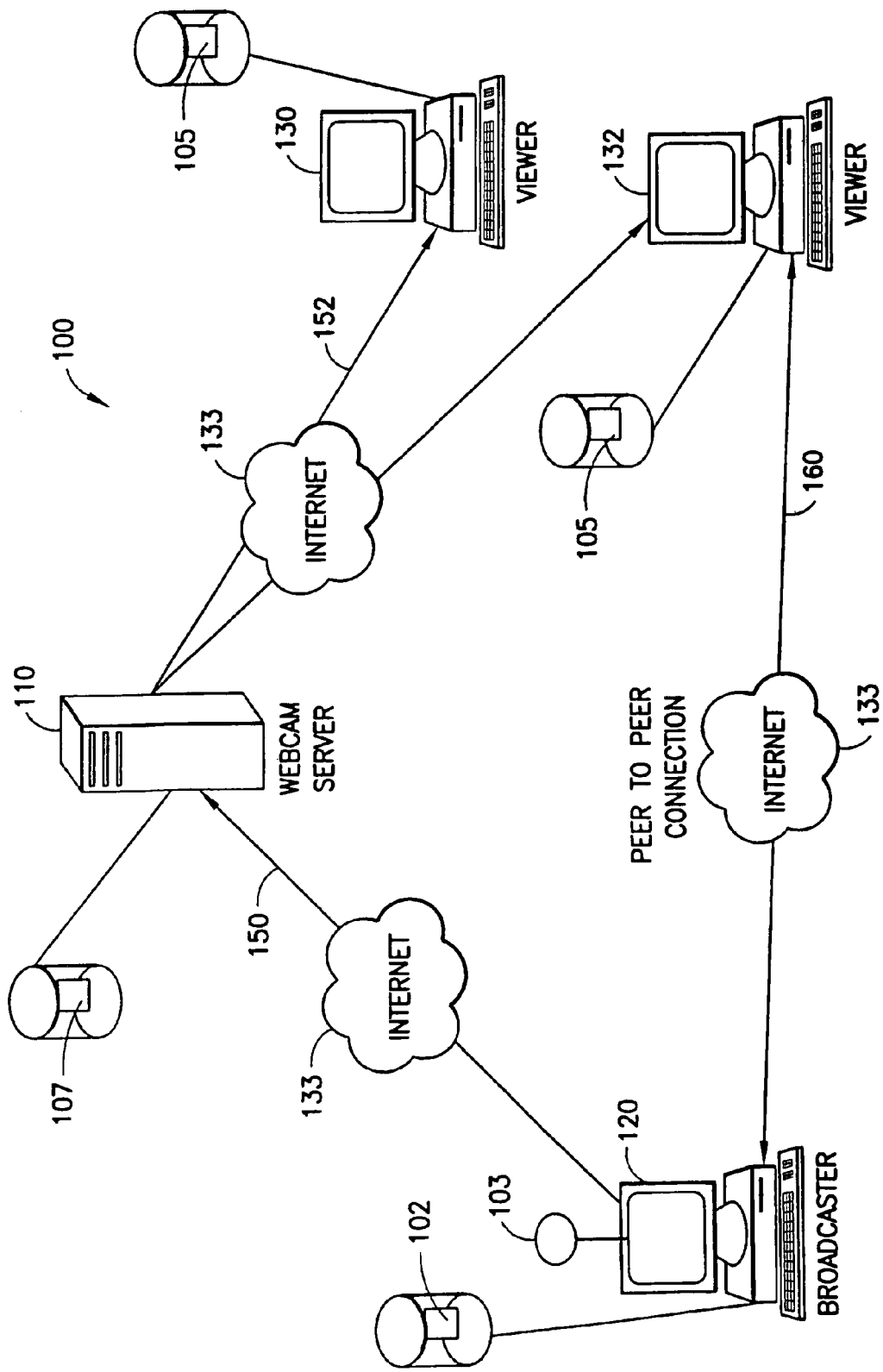
FIG. 1 is a schematic diagram of an overview of a exemplary embodiment of the system architecture of a system and method for transmitting images in accordance with the present invention.

With reference to FIG. 1, there is shown an exemplary embodiment of a system and method for transmitting images 100. System 100 generally comprises: one or more viewer computers 130, 132 for fetching and displaying images of a user; one or more broadcaster computers 120 for uploading images of a user and transmitting the images to a Webcam server 110 and/or one or more viewer computers 130, 132; and one or more Webcam servers 110, for receiving images, and/or controlling and/or monitoring information from one or more broadcaster computers 120, transmitting those images to viewer computers 130, 132, and controlling and monitoring the uploading, transmitting and viewing of images by users.

In an exemplary embodiment, Webcam server 110 is implemented in one or more computing devices, now known or hereafter to become known, that can be configured to permit Webcam server 110 to control and monitor the uploading, transmitting and viewing of images by clients, and perform other functions taught herein or recognized by those of skill in the art. In certain embodiments, the Webcam server 110 is one or more servers running an operating system, for example, Windows NT/2000 or Sun Solaris.

Webcam server 110 communicates with user computers (broadcaster computers 120 and viewer computers 130, 132), authenticates user information, receives images from an uploader system (discussed below) on the broadcaster computer 120 and transmits images to the viewer computers 130, 132. Webcam server 110 may have loaded thereon server system 107. In an exemplary embodiment, server system 107 may be software designed and configured to facilitate performance of server functions including the storage of data and parameters in memory at Webcam server 110. Additionally, Webcam server 110 preferably caches images in memory to ensure that the reading and writing of images is fast and efficient. The Webcam server 110 may manage viewer computers 130, 132 on heterogeneous networks (networks with different bandwidth and information flow capabilities) by refraining from sending images (dropping images) as and when viewer computers 130, 132 fail to consume images at the supplied rate (as discussed below). This provides a scalable frame rate at a fixed image quality while adapting the process of transmitting images to dynamic micro-variations within a network.

The broadcaster computer 120 may be any type of computer or computing device used by a user, as long as the computer may be equipped with an image capturing device or Webcam such as a camera/video device 103 for electronically capturing images of a user. In alternative embodiments, broadcaster computer 120 may be a desktop or notebook computer, PDA, hand held device, or wireless phone (with graphics capability), or any other device now known or hereafter developed that is capable of performing the functions as described herein. In an exemplary embodiment of the invention, broadcaster computer 120 may have loaded thereon uploader system 102. The uploader system 102 may be software that resides on broadcaster computer 120 for execution in a conventional manner. The uploader system 102 captures images from camera/video device 103, (such as, for example, video devices that support Microsoft Direct Show), compresses the image using, for example, a wavelet based JPEG 2000 code, and transmits it to the Webcam server 110. The uploader system 102 may comprise an inner Networking and Imaging ("N&I") component interacting with and, in the programming vernacular, "wrapped around" a user interface ("UI") component. In an exemplary embodiment, the N&I component may be common across a variety of software applications, for a given software platform, while the UI component can be customized and tailored to the need of specific applications and even localized.

The viewer computer 130, 132 may be any type of computer or computing device used by a user, as long as the computer is capable of displaying images, for example, in JPEG or any other now known or hereafter developed format. Accordingly, viewer computer 130, 132 may be a desktop or notebook computer, PDA, hand held device, or wireless phone (with graphics capability), or any other device now known or hereafter developed that is capable of such displays. In an exemplary embodiment, a viewer system 105 is loaded on viewer computer 130, 132. The viewer system 105 may be software residing on the viewer computer 130, 132 for execution in a conventional manner.

When the viewer computer 130, 132 is communicating with the Webcam server 110 over a communication network 133 such as, for example, the Internet, Local Area Network ("LAN") or Wide Area Network ("WAN"), the viewer system 105 persistently fetches images from either the Webcam server 110 or, under certain circumstances, as discussed below, directly from broadcaster computer 120. As described further herein, the viewer system 105 preferably provides a simple window that displays images and status messages on a status bar including a time stamp of the last received image, although the precise configuration is a matter of design choice based on the teachings herein. In an exemplary embodiment, the image may be zoomed to, for example, 100%, 200%, or 300% of the original size or full screen. Additionally, in an exemplary embodiment, the viewer system 105 may (in a manner that may be transparent to the user) pause the viewer system when a user has minimized the viewer window or a user's screen saver activates, thereby avoiding network activity when it is not required.

In an exemplary embodiment, as system 100 is used, broadcaster computer 120 and viewer computer 130, 132 attempt to establish peer-to-peer connections. If a peer-to-peer connection is established, images are passed directly through communication path 160 from broadcaster computer 120 to viewer computer 130. If no peer-to-peer connection is established, or if multiple viewer computers 130, 132 are used with the broadcaster computer 120, the broadcaster computer 120 uploads images to the Webcam server 110 via communication path 160 for distribution by Webcam server 110. In an alternate embodiment, multiple peer-to-peer links may be established between broadcaster computer 120 and multiple viewer computers 130, 132.

Images may be uploaded from broadcaster computer 120 to Webcam server 110 through communication path 150 if no peer-to-peer connection is established between the broadcast computer 120 and viewer computer 130 or if there are multiple viewer computers 130, 132 viewing images in near simultaneity.

When routed via Webcam server 110, images may be transmitted through communication paths 152, 154 to multiple viewer computers 130, 132.

In an exemplary embodiment, the Webcam broadcaster computer 120, viewer computers 130, 132 and Webcam server 110 may communicate using any now known or hereafter developed protocol, including a proprietary protocol that runs over, for example, TCP port 5100. A single persistent connection and a common protocol may be used to communicate both control information and image data. The protocol may be "light weight" and essentially based on binary control headers followed by a fixed length data. The control header may contain information about the nature and type of the fixed length data and the action to be performed. The Webcam server 110, broadcaster 120 and viewer 130, 132 computers interpret the control headers appropriately and ignore them if not understood. One skilled in the art will recognize that the particular communication protocol implemented may be varied in manners now known in the art, or hereafter to become known, to accomplish the teachings herein.

In an embodiment of the invention, the broadcaster computer 120, viewer computer 130, 132 and/or Webcam server 110 may communicate in a variety of manners, including but not limited to a network using a data packet transfer protocol (such as the Transmission Control Protocol/Internet Protocol ("TCP/IP"), User Datagram Protocol/Internet Protocol ("UDP/IP")), a plain old telephone system ("POTS"), a cellular telephone system (such as the Advance Mobile Phone Service ("AMPS")), a digital communication system (such as GSM, TDMA, or CDMA) or any other now known or later-developed technology or protocols. Accordingly, while an exemplary embodiment of system 100 may provide for the transmission of images and data via the Internet, transmission of images and data may also be provided via other networks such as, for example, internal corporate wired or wireless local area networks ("LANs") or wide area networks ("WANs"), or any other communication media over which data may be exchanged.

In an exemplary embodiment, the system 100 may use a client-server architecture with two distinct processes involved. The first process involves uploading images taken from a broadcaster computer 120 to the Webcam server 110, while the second process is the retrieval of images from the Webcam server 110 and transmission of the images to the viewer computers 130, 132 for the purpose of viewing.

This architecture supports the sharing of images from one broadcaster computer 120 to many viewer computers 130, 132 without any additional burden on any of the broadcaster 120 or viewer 130, 132 computers or degradation of service. Dedicated connections facilitate improved refreshing of viewer images while improving security and lowering network overhead. The architecture allows for a variety of image viewers, including client specific applications, Web browsers and PDAs. This architecture also readily yields itself to use in heterogeneous networks where each user could be connected to a network with different bandwidth capabilities.

Furthermore, a set of servers or server farms distributed throughout the communication network may be employed (not shown) to accomplish the functionality of server 110, so that most users will be reasonably close to at least one of the server farms. Additionally, the system as described minimizes the inability of any user to interact with the system due to blockage by a firewall, since both the broadcaster 120 and viewer 130, 132 computers make outbound connections to the Webcam server 110, a type of connection which is generally more commonly accepted by firewalls than are inbound connections.

A special case (discussed in greater detail below) occurs when there is one broadcaster computer 120 and one viewer computer 130. Under these circumstances, in accordance with an embodiment of the invention, image data may flow directly from the broadcaster computer 120 to the viewer computer 130 (i.e., peer-to-peer instead of passing through the Webcam server 110). In this scenario, the broadcaster computer 120 and the viewer computer 130 may have the ability to shift between peer-to-peer and server modes as deemed optimal by system 100, preferably without the need for user intervention.

In an exemplary embodiment, system 100 provides for security and authentication to establish that a client user is in fact who he/she claims to be. The task of allowing or denying permission for a viewer computer 130, 132 to view a specific broadcaster computer's 120 images is preferably controlled by the uploader system 102 at the broadcaster computer 120, although this may be a server based function.

In an exemplary embodiment, token-based authentication may be used when images are to be broadcasted or viewed. Authenticating the user may be accomplished by the uploader system 102 and/or the viewer system 105 requiring a client to enter a password or identifier ("ID"), and then matching the entered ID to it with that found in a universal database ("UDB") 1310 (see FIG. 13A). In an exemplary embodiment of the invention, the UDB 1310 may reside at server 110 and may comprise user parameters such as, by way of non-limiting example, user ID parameters, user password parameters, user name parameters, mail preferences parameters, application parameters and address book parameters. When a match is made, the uploader system 102 or viewer system 105 may generate a token, which is understood only by the server system 107 at Webcam server 110. For additional safety, the tokens may have a timeout period after which time they expire.

It will be understood by those skilled in the art that while Webcam server 110 is discussed herein generally as being embodied in a single server computer, Webcam server 110 may comprise any number of interconnected computers. In addition to providing the basic functionality described above, the architecture of the Webcam server 110 may provide scalability, redundancy, the ability to automatically recover from errors and crashes in the system and provide free time for scheduled maintenances, all with limited or no disruption in service. To achieve this, in an exemplary embodiment, a master-slave arrangement of n servers (not shown) may be used. In such an arrangement, which is within the skill of those skilled in the present art based on the disclosure herein, two servers, for example, may be masters and the rest may be slaves.

Figure 13A:
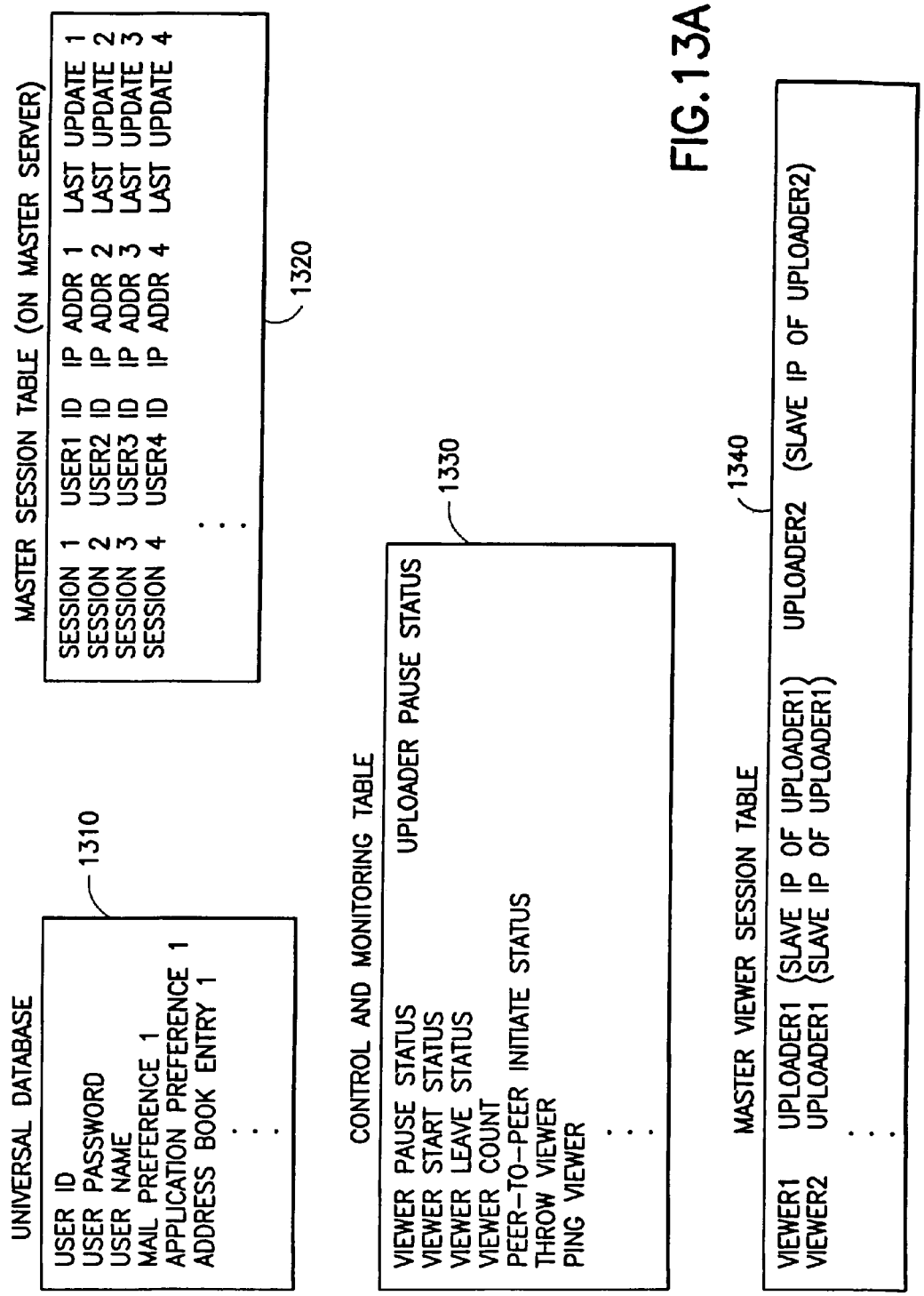
FIG. 13A is a block diagram depicting exemplary data tables in accordance with the present invention.

In such an arrangement, both of the masters may (but need not) be identical and each may store information about the state of the various active Webcam sessions in a master session table 1320 (see FIG. 13A). The master session table 1320 may reside on a master server and may contain information pertaining to a Webcam session such as, for example, a listing of all active Webcam sessions. Parameters in the master session table 1320 for each session may comprise a user name, IP address of the slave handling the session, time of last update, etc.

Slaves may handle the authentication and transfer of images during a session. They may cache the images for each user in memory between the times they are updated and feed it to any viewer that requests it.

The slaves may maintain a dedicated connection with the master and update the session tables when a user is added or removed and update the complete session table on a regular basis, such as, for example, once every 120 seconds. The slaves may also send a heart beat pulse on a regular basis, such as, for example, every second, to keep up-to-date the list of live slaves and balance the load on the slave servers.

At the beginning of a session, a master may redirect the broadcaster computers 120 to the slave with the least load. This slave may then be responsible for the rest of the session. When a viewer computer 130, 132 requests images for that broadcaster computer 120, the masters read the information from the session table and redirect the viewer computers 130, 132 to the correct slave. The slave may now serve the images, and the viewer computer 130, 132 contacts that same slave for all future requests.

In an exemplary embodiment, the masters may be placed behind a device that provides a virtual IP address to a user's computer and redirects any incoming traffic to one of the master servers, while providing the illusion of a single server to all user computers, and while balancing the load to each server, as is known by those skilled in the art, (such a device commonly being referred to as a foundry by those skilled in the art). To reduce overhead, the foundry does not interfere with any return traffic. Also, when an entire server farm is small enough, the masters can also act as slaves to minimize hardware and maintenance costs.

In a master/slave embodiment, scalability may be achieved by adding as many slaves as required. Redundancy of masters facilitates a scenario where there will always be at least one active master to start new sessions and n−2 degrees of redundancy for the slaves. It also allows for dynamic load distribution by the master. During scheduled maintenance, the Webcam servers 110 may be brought down one at a time. The Webcam servers 110 may then instruct broadcaster computer 120 and viewer computers 130, 132 to reconnect to a different slave, thereby minimizing downtime for the Webcam service.

Although not depicted in the figures, the servers and computers described herein generally include such other art recognized components as are ordinarily found in server systems, including, but not limited to, CPUs, RAM, ROM, memory, clocks, hardware drivers, interfaces, and the like. The servers are preferably configured using the Windows®NT/2000, UNIX or Sun Solaris operating systems, although one skilled in the art will recognize that the particular configuration of the servers is not critical to the present invention. Furthermore, different tasks, illustrated herein as being performed on separate and distinct servers, may, in some embodiments, be performed on the same server. Conversely, individual tasks, illustrated herein as being performed on a single server, may be distributed among several servers.

With reference to FIGS. 2A-4B, there is illustrated an exemplary process flow of a broadcaster computer 120 and viewer computers 130, 132 forming a Webcam session.

Figures 1, 2A:
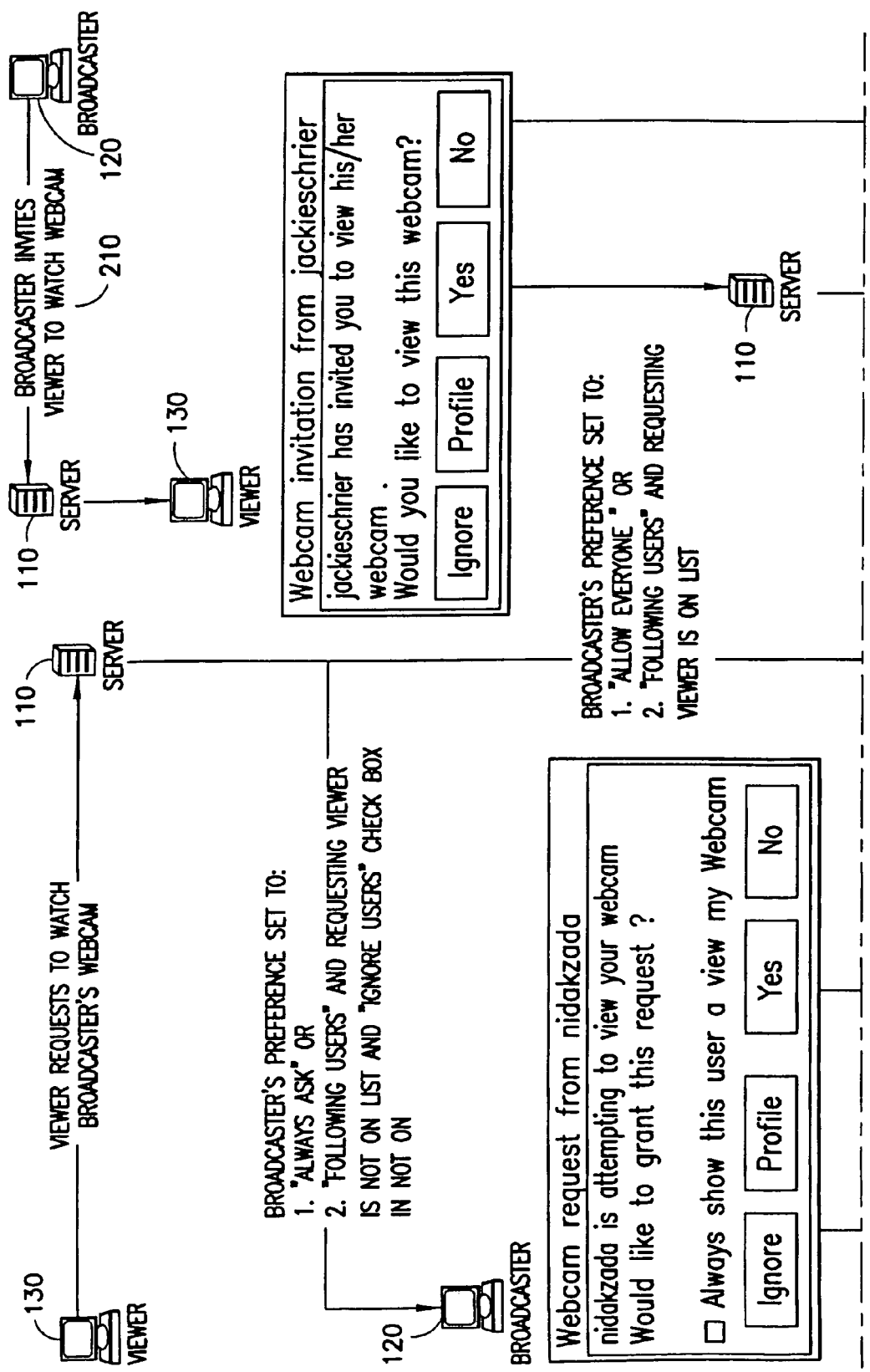
FIGS. 2A and 2B are flow diagrams of a process of a broadcaster connecting with a first viewer in accordance with an exemplary embodiment of the present invention.
Figures 2, 2B:
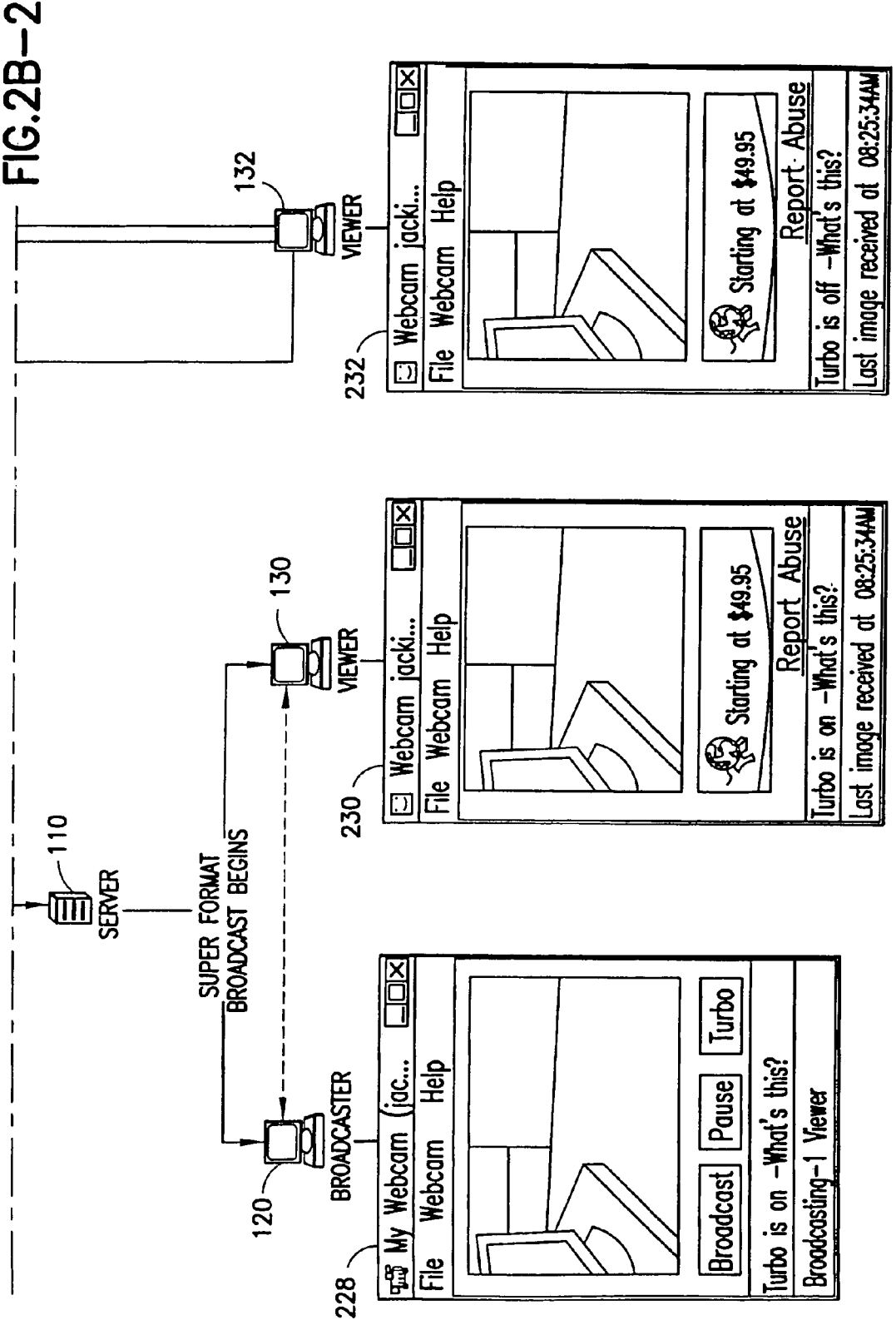

Turning first to FIGS. 2A and 2B, there is illustrated an exemplary process flow for a communication session that begins with one user at a viewer computer 130 asking permission to see one other user's Webcam images sent from a broadcaster computer 120. First, in step 210, the broadcaster computer 120 invites viewer computer 130 to view images from the broadcaster computer 120 Webcam. The communications are handled by and through Webcam server 110. Next, in step 212, the viewer computer 130 requests to view images from the broadcaster computer 120. Next, in step 214, the broadcaster computer 120 begins broadcasting images to the viewer computer via the Webcam server 110. Next, in step 216, because only one viewer computer 130 is viewing, the broadcaster computer 120 alerts the broadcasting user that a peer-to-peer connectivity option (also referred to herein as "turbo" mode) is available. At this point, in step 218, the broadcaster computer 120 may query the broadcasting user as to whether a peer-to-peer connection should always be used if available. The broadcasting user, in step 224, can then select a peer-to-peer connection (either always, if possible, or just for the current Webcam session, the specific selection being stored as a parameter value in universal database 1310). At this point, in step 226, if so requested, a peer-to-peer link is established between the broadcaster computer 120 and the viewer computer 130. During a peer-to-peer connection, the image data is transmitted from the broadcaster computer 120 to the viewer computer 130 without passing through the Webcam server 110. In this scenario, only control and monitoring data continues to be passed through the Webcam server 110. In an exemplary embodiment, control and monitoring data may be stored at the Webcam server 110 in control and monitoring table 1330 (see FIG. 13A). Parameters that may be stored in control and monitoring table 1330 may comprise viewer pause status, uploader pause status, viewer start status, viewer leave status, viewer count, peer-to-peer initiate status, as well as other parameters.

Figures 2, 3A:
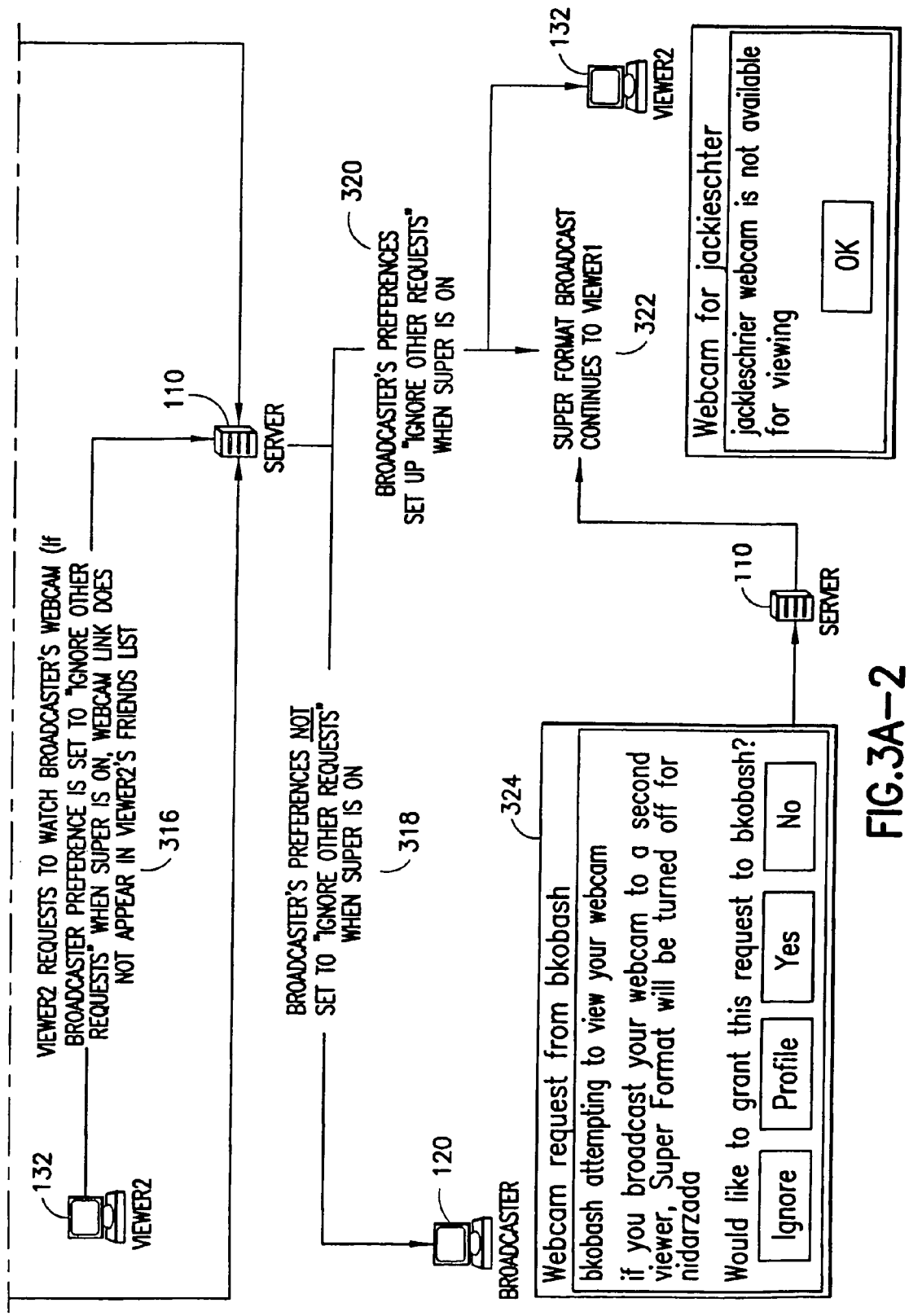
FIGS. 3A and 3B are flow diagrams of a process of a second viewer joining the broadcaster and first viewer of FIGS. 2A and 2B.
Figures 2, 3B:
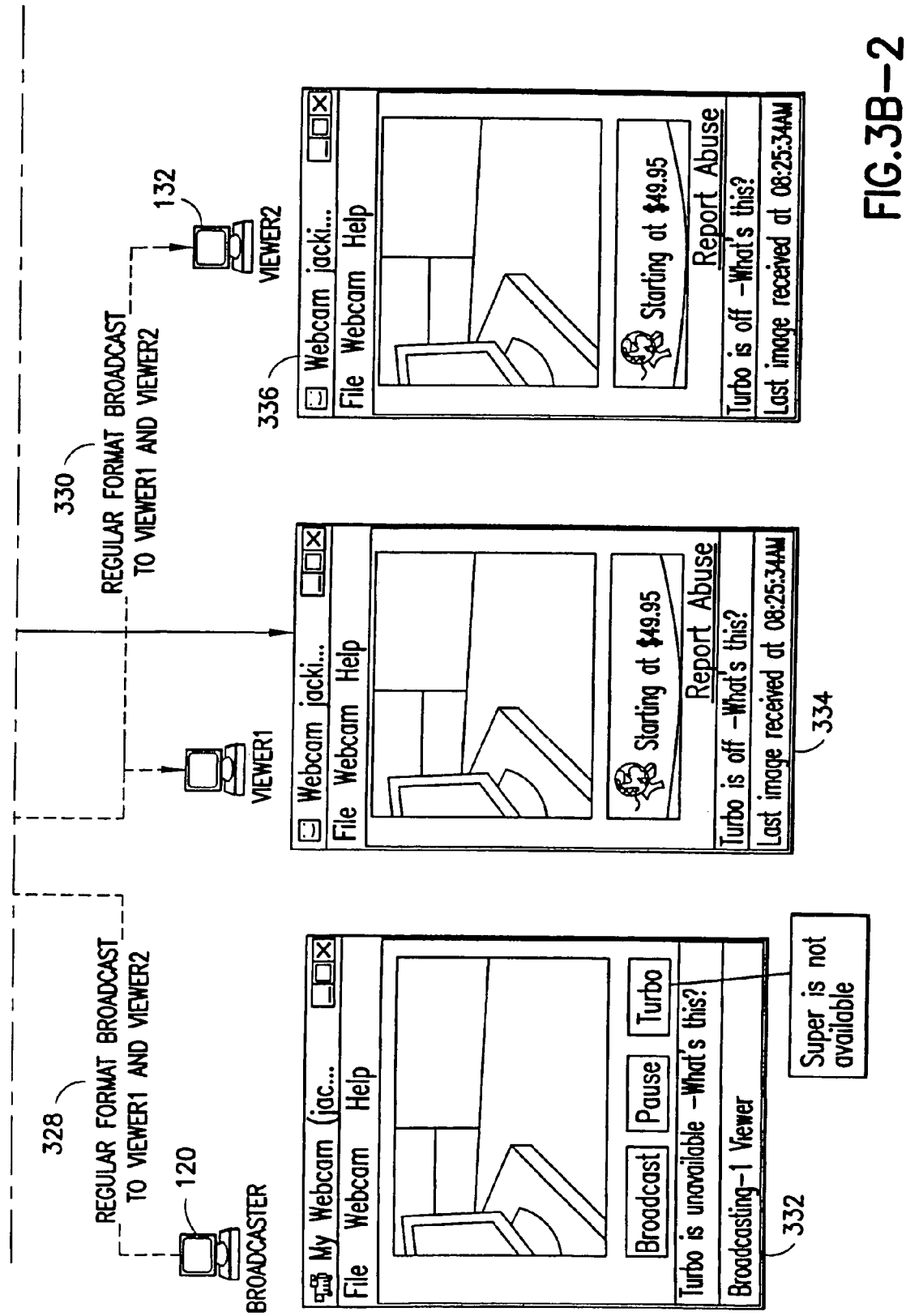

Turning now to FIGS. 3A and 3B, there is illustrated a continuation of the above-described exemplary process flow, during which a second viewing user at viewer computer 132 joins the Webcam session. Generally, a second viewer joins the Webcam session, for example, by asking permission to view the broadcaster computer 120 Webcam. When this occurs, system 100 switches from sending images via a peer-to-peer connection and instead reroutes the images to Webcam server 110 while also keeping the peer-to-peer connection active (the peer-to-peer connection may be kept active so that images may revert to being sent via the peer-to-peer link under circumstances described below). First, in step 310, as discussed above, the broadcaster computer 120 transmits images to a first viewer computer 130 via a peer-to-peer connection, without the images passing through Webcam server 110. It should be understood that although the connection between the broadcaster computer 120 and viewer computer 132 as shown is a direct connection, the connection may be via components other than the Webcam server 110, such as components comprising the Internet or the network in which the broadcaster computer 120 and viewer computer 132 reside. /Next, in step 316, a second viewer, using a second viewer computer 132 requests to view images from the broadcaster computer 120. If, in step 322, the broadcaster computer 120 has its preferences set to "ignore other requests," then the second viewer computer 130 will not be permitted to join the Webcam session, and the broadcaster computer 120 and first viewer computer 130 will continue a Webcam session in peer-to peer-mode. If, in step 324, on the other hand, the broadcaster computer 120 does not have its preferences set to "ignore requests," then the broadcasting user at the broadcaster computer is alerted that peer-to-peer mode will be discontinued if a second viewer computer is permitted to join the Webcam session. If, in step 378, the broadcasting user at the broadcaster computer 120 permits the second viewer computer 132 to join the Webcam session, then the broadcaster computer 120 transmits images to Webcam server 110, which in turn transmits the images to both the first viewer computer 130 and the second viewer computer 132. The peer-to-peer connection, while no longer used to transmit images in this scenario, for reasons discussed below, is still maintained between the broadcaster computer 120 and the first viewer computer 130.

Figures 1, 4B:
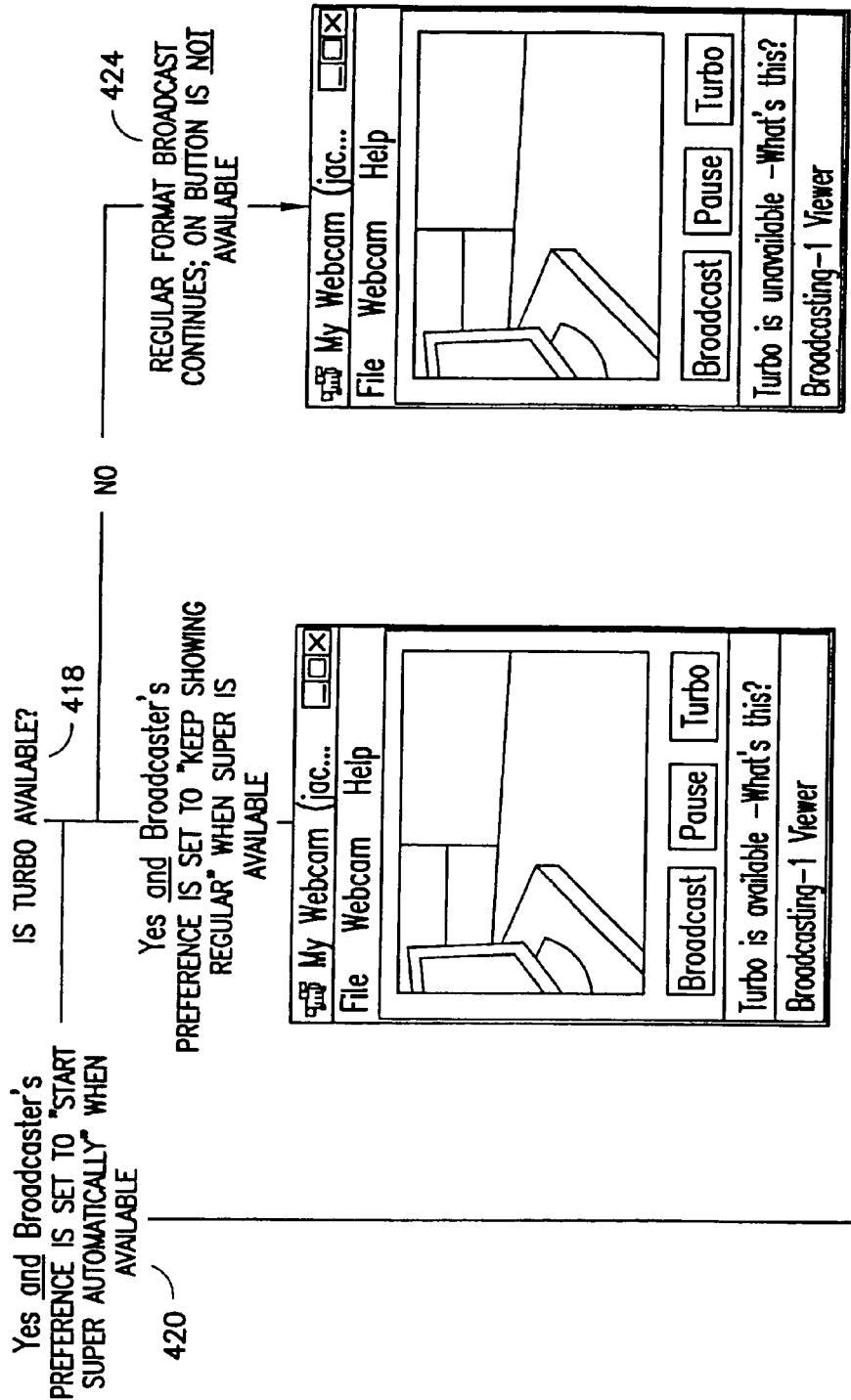

Turning now to FIGS. 4A and 4B, there is illustrated a continuation of the above-described exemplary process flow, during which a second viewing user at viewer computer 132 leaves the Webcam session (in an embodiment of the invention, all but one of the viewing computers would leave the viewing session if more than one viewing computer was viewing broadcaster computer 120). Generally, the second viewer terminates the viewing session, and the system 100 may revert back to transmitting images via the peer-to-peer connection that was maintained (although it was not being used to transmit images when two viewers were in the Webcam session), as described above. First, in step 410, as described above, a Webcam session takes place wherein the broadcaster computer 120 transmits images to Webcam server 110, which in turn transmits the images to both the first viewer computer 130 and the second viewer computer 132. The peer-to-peer connection, however, is still maintained between the broadcaster computer 120 and the first viewer computer 130. Next, in step 416, the second viewer at second viewer computer 132 decides to leave the Webcam session. At this point, in step 418, the Webcam server 110 analyzes parameters in the session database to determine whether a peer-to-peer connection is now available between the broadcaster computer 120 and the first viewer computer 130. If, in step 424, the Webcam server 110 determines that a peer-to-peer connection is not available, then the Webcam session continues with images being transmitted via the Webcam server 110. If however, in step 426, the Webcam server 110 determines that a peer-to-peer connection is available at this point in the process, then a peer-to-peer connection is used to transmit images from the broadcaster computer 120 to the first viewer computer 130.

Figure 5:
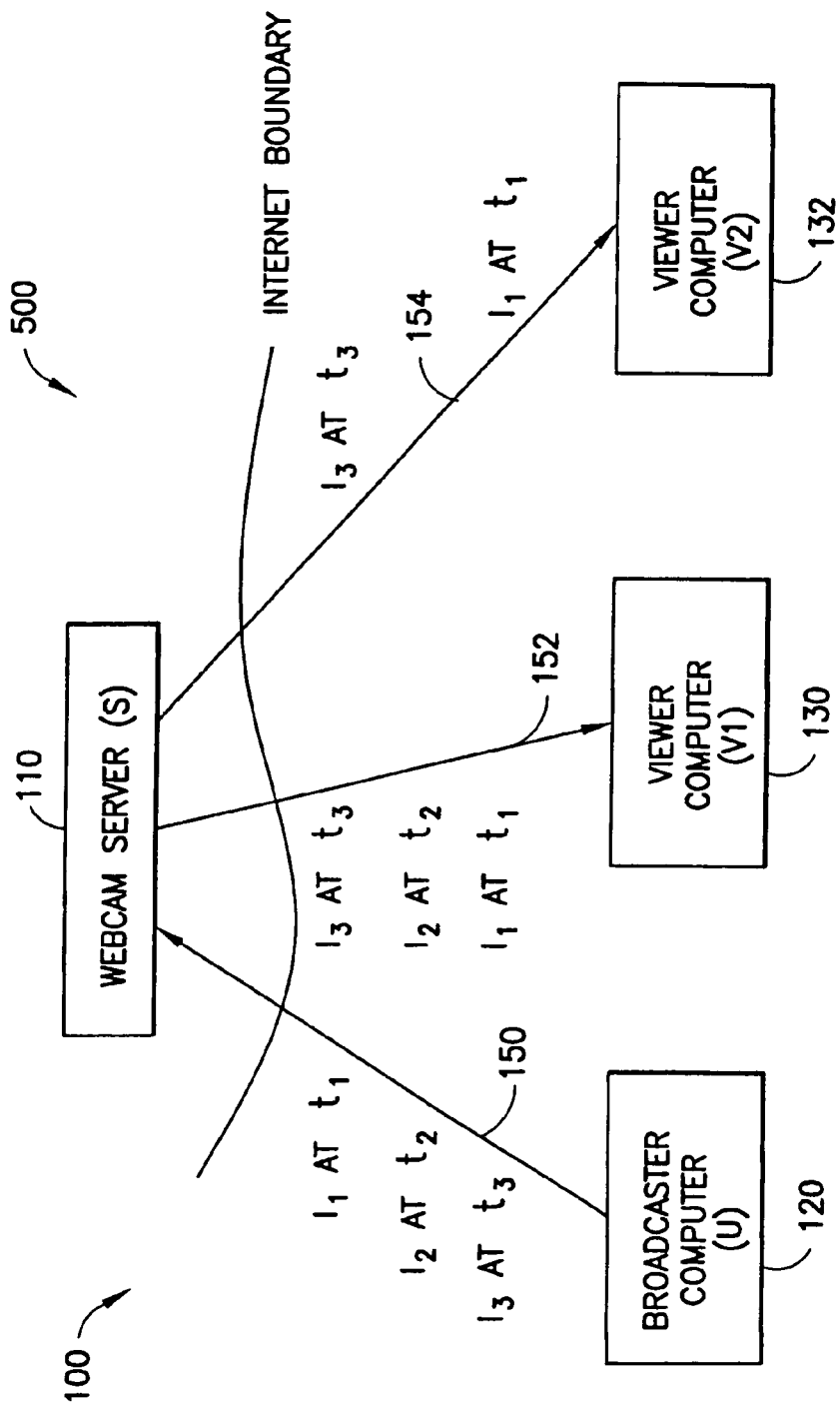
FIG. 5 is a block diagram depicting graceful degradation of image transfer in accordance with the present invention.

Turning to FIG. 5, there is illustrated an embodiment of an optional process 500 of bandwidth control for system 100 referred to herein as graceful degradation. By this process 500, server system 107 preferably keeps track of whether an image has been successfully fetched by each viewer computer 130, 132.

Specifically, each of server system 107 and uploader system 102 preferably determines if an image has been fully sent (or not) by checking a socket connection. As described herein, a socket is a software object that connects either the server system 107 or uploader system 102 to a network protocol. For example, server system 107 and broadcaster system 102 may send and receive TCP/IP messages by opening a socket and reading and writing data to and from the socket. This simplifies the server system 107 or uploader system 102 functionality because the server system 107 or uploader system 102 need only manipulate the socket while a computer operating system controls the transport of messages across the network. A socket in this sense is a software object, although it may be implemented in firmware.

In an exemplary embodiment of the system, the socket connection may be either a blocking type or a non-blocking type. In a blocking socket, by definition, the socket connection is unavailable until the desired data has been fully transmitted. In a non-blocking socket, the server system 107 or uploader system 102 maintains a count of the number of bytes being actually sent versus the number of bytes in an image to be transmitted. This count may reside in memory as part of either server system 107 on Webcam server 110 or uploader system 102 on broadcaster computer 120. When the two values are equal (or within a predetermined range), the server system 107 or uploader system 102 recognizes that the image was fully sent.

If, due to a network bottleneck, an image has not been successfully fetched, server system 107 does not send the next image, so that the bottlenecked network does not become more bottlenecked. Each time an image is successfully fetched by viewer computers 130, 132, the viewer system 105 of each viewer computer 130, 132 forwards a transmission complete signal to server system 107 on Webcam server 110. The transmission complete signal status is stored in the memory of server system 107 of Webcam server 110. If server system 107 sends and image to a viewer computer 130, 132, and does not receive a transmission complete signal back from a certain viewer computer 130, 132, the viewer computer signal complete status is not recorded at Webcam server system 107 of Webcam server 110, and further image transmission may be held up until a completion signal is successfully recorded.

In an exemplary embodiment if the application, the graceful degradation function is not implemented if a peer-to-peer link is established between the broadcaster computer 120 and the viewer computer 130, although, such a system could be implemented.

Generally, graceful degradation is a process by which the server system 107 residing on Webcam server 110 may drop entire image frames gradually, i.e., gracefully degrade the rate at which images are transmitted to viewer computer 130, 132, without material disruption of the continuity/quality of the user experience. Inherently, most networks experience sudden, intermittent and temporary delays or other problems, which can cause undesired behavior or poor performance. By dropping image frames only as needed per user, the process 500 and system 100 provide improved performance within the bandwidth limitations of the underlying network. In certain embodiments, frame resolution is also decreased to further reduce needed bandwidth.

With continued reference to FIG. 5, system 100 is shown comprising broadcaster (or uploader) computer 120 and two viewer computers 130, 132, all of them connected to the Internet at the same speed (i.e., the connections have the same bandwidth). For ease and simplicity of explanation, it is to be assumed that there are no network bottlenecks (a network bottleneck being exemplified herein as packet loss and/or other network delay) between broadcaster computer 120 and the Webcam server 110 via communication path 150. It is also to be assumed that the communication path 152 between Webcam server 110 and viewer computer 130 has no network bottlenecks, while communication path 154 between Webcam server 110 and second viewer computer 132 has intermittent network bottlenecks.

By way of illustrative example, at time $t_1$, broadcaster computer 120 uploads an image frame ($I_1$) to the Webcam server 110. $I_1$ arrives at Webcam server 110 delayed only by the normal network latency between the broadcaster computer 120 and Webcam server 110. The server computer 110 sends $I_1$ to both viewer computers 130 and 132 at substantially the same time. Since the communication path 152 between server 110 and viewer 130 has no network bottlenecks, $I_1$ arrives at viewer computer 130 virtually instantly, delayed only by the network latency of the communication path 152, and an image completion signal is sent to server 110 by viewer computer 130. Since the communication path 154 has intermittent bottlenecks, $I_1$ takes a longer time to arrive at second viewer computer 132. In the interim, at time $t_2$, the broadcaster computer 120 sends the second image frame $I_2$ to Webcam server 110, which gets routed to viewer computer 130 in like manner to $I_1$. However, when $I_2$ arrives at Webcam server 110, $I_1$ is still being sent out to viewer computer 132 because of the network bottleneck at communication path 154, and thus no image completion signal has yet been received at Webcam server 110 from viewer computer 132. Hence, the Webcam server 110 does not send 12 to second viewer computer 132 (i.e., employs graceful degradation for that user). At time $t_3$, broadcaster computer 120 sends the third image frame $I_3$ to Webcam server 110. By this time, $I_1$ has been completely sent to second viewer computer 132 and thus an image completion signal is received at server 110 from viewer computer 132 for frame $I_1$. Hence Webcam server 110 sends $I_3$ to both viewer computers 130 and 132. The net effect of the entire sequence of operations is that the image frame $I_2$ is not sent to viewer computer 132, but is sent to viewer computer 130.

In the above example, every other image frame reached second viewer computer 132. However, in other scenarios, every third image, or a varying sequence of images, such as, for example, the first, third, fifth, sixth and eighth images may be sent to viewer computer 132, depending upon the varying state of the network conditions. The specific frames and number of frames dropped depends on whether a previous image has been sent and received, and need not be based upon a firm, hard coded schedule. As such, the determination of which frames are to be dropped can be a dynamic process based upon the ever changing state of communications.

Also, the above example assumed only the communication path 154 to have intermittent network bottlenecks. Of course, one skilled in the art would recognize that in another scenario, communication paths 150 and 152 could also have intermittent network bottlenecks, in which case frames might also not be sent from Webcam server 110 to viewer computer 130. Furthermore, communication path 150 might also have intermittent network bottlenecks, in which case, in a manner similar to that described above, certain images may not be sent from broadcaster computer 120 to Webcam server 110.

A benefit of the graceful degradation embodiment of system 100 is that it facilitates Webcam server 110 sending images to different viewer computers 130, 132 at different rates. Accordingly, images need not be sent to all viewer computers 130, 132 at the rate of the slowest connected viewer computer 130, 132, (i.e., the lowest common denominator).

Figure 6:
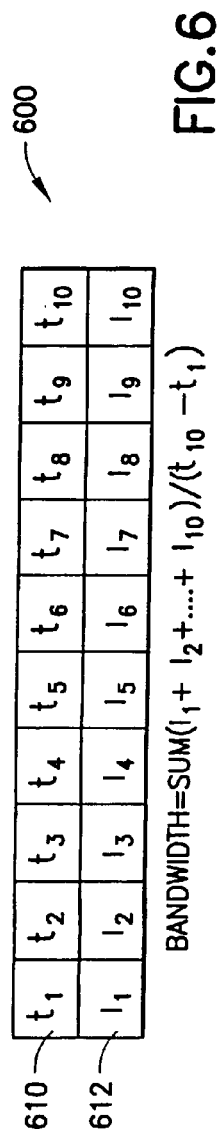
FIG. 6 is a chart depicting an exemplary sliding window throttle algorithm in accordance with the present invention.
Figure 7:
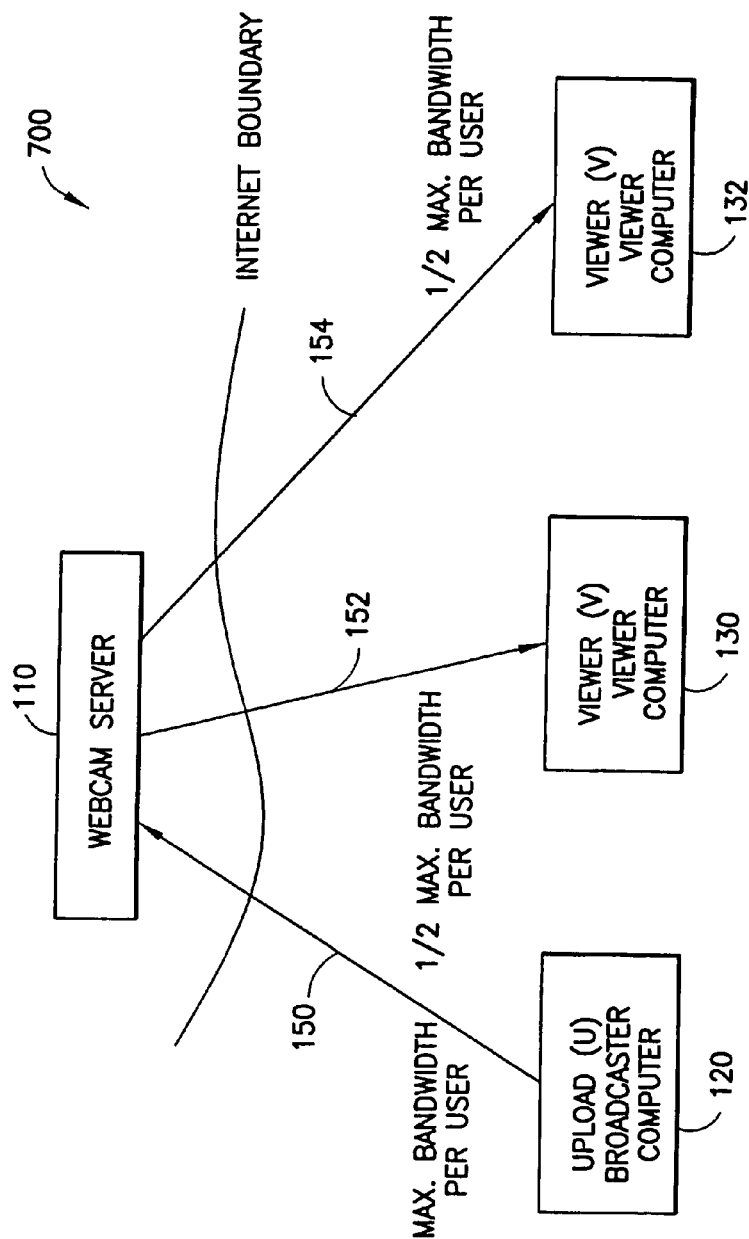
FIG. 7 is a block diagram depicting an exemplary method of limiting bandwidth in accordance with the present invention.

Turning to FIGS. 6 and 7, there is illustrated an embodiment of a process 700 by which system 100 controls system performance by limiting the bandwidth allotted per user. Generally, limiting the bandwidth per user, as described herein, means that the system 100 assigns each viewer computer 130, 132 a maximum amount of bandwidth that it may utilize in communicating with the Webcam server(s) 110 at any given point in time, which may be varied over time, if desired, if bandwidth conditions permit, or if so desired for other user determined reasons. The maximum bandwidth per user is assigned by server system 107 and may be stored in universal database 1310.

Turning to FIGS. 6 and 7, the limiting of bandwidth consumed by each user occurs at both the broadcaster computer 120 and viewer computer 130, 132 or, in alternate embodiments, any subset thereof. In the case of limiting the bandwidth at the broadcaster computer 120, each user is allowed to have only one active broadcasting (or uploading) session at any given time. A throttling mechanism, preferably implemented as a software algorithm by either the uploader system 102 of broadcaster computer 120 or by the server system 107 of Webcam server 110, is used to limit the maximum network bandwidth used. With reference to FIGS. 6 and 7, the throttle data structure 600 consists of a sliding window array of paired time 610 and data length 612 values. The times 610 represent the instant of time when a packet of data (in this case an image, or data representing a portion of an image) is received (either by the Webcam server 110, if uploaded via communication path 150 from a broadcaster computer 120, or by a viewer computer 130, 132, if fetched by viewer computers 130, 132 from Webcam server 110 via communication paths 152 and 154 respectively) and the data lengths 612 represent the length or size of each packet of data, for example, in bytes. The number of samples over which the throttling is to be done decides the length of the paired array. Every time a packet of data is received, the paired array (610, 612) is used to calculate the current bandwidth used (bandwidth=total data length/time interval). The calculation may be performed by the uploader system 102 on broadcaster computer 120 for communication path 150, and by Webcam server system 107 on Webcam server 110 (by an algorithm residing in the respective software system). If the used bandwidth is less than the allowable bandwidth, then the packet of data is processed normally and its values are entered into the paired array. If the bandwidth used is greater than a predetermined, or desired allowable bandwidth, the packet is discarded and a value of 0 for the data length is used as the entry in the paired array. Alternatively, in another embodiment of the invention, based on a modification of the algorithm used, it is also possible to delay processing this packet of data by an arbitrary time so as to limit the maximum bandwidth used. In this scenario, the frame rate may be lowered, while the image quality (resolution) may remain the same.

Additionally, viewer computers 130, 132 may be configured to also throttle to control bandwidth use if multiple viewer windows are open on a single viewer computer (more than one broadcaster is being viewed). In an embodiment of the system, throttling for the viewer computers 130, 132 is similar to that described above. However, in such a case, the allowable bandwidth per user is divided by the total number of active sessions or viewer windows open to compute the allowable bandwidth per session, and this computed value is used in the throttling mechanism. To keep track of the total number of active viewer sessions, the Webcam server(s) 110 maintains a map of all users and the list of active viewing sessions for each user. In an embodiment of system 100, that map may be in the form of a master viewer session table 1340 (see FIG. 13A), residing in memory as part of server system 107. When the number of viewing sessions changes, the server system 107 transmits a message to viewer computer 130, 132 informing each of the sessions to accordingly adjust the maximum allowable bandwidth for that session. The master viewer session table 1340, which may reside on the master Webcam server, may contain a list of all unique viewers for a particular uploader (broadcaster). For each unique viewer, a list is maintained containing the list of uploaders that a particular viewer is viewing, and the IP address of the slave on which that uploader resides. For example, table 1340 illustrates an exemplary parameter set reflecting a scenario wherein viewer computer 130 is viewing broadcaster computer 120 (U1) plus a second broadcaster computer (not shown) (U2), while second viewer computer 132 (V2) is viewing only broadcaster computer 120 (U1).

A benefit of limiting bandwidth on a per user basis is that each user at viewer computers 130, 132 cannot view an excessive number of Webcam sessions and rapidly increase the bandwidth usage (and thus presumably cost) to the Webcam service provider and/or overwhelm the Webcam servers 110, (since the Webcam server(s) send(s) a separate image stream for each window on viewer computer 130, 132 that a user has open). Thus, even if a user at viewer computer 130 initiates multiple viewer sessions (attempts to view images from multiple broadcaster computers 120), the bandwidth assigned to that viewer computer 130 will not increase, because the system 100 has the capability, as described above, to detect multiple viewer Webcam sessions and lower the frame rate per viewer session accordingly to keep overall bandwidth per user within predetermined limits. In certain embodiments, the system can also lower the frame resolution. In certain embodiments, the system allows a user to increase bandwidth, for example, to a predetermined amount or by a certain percentage before limiting the bandwidth. In certain of such embodiments, each user's available increase is associated with a different level of service (e.g., free versus paid.)

Another benefit of the per user bandwidth limitation is that it facilitates maximizing of performance given a set bandwidth limitation. Accordingly, a Webcam service provider may be protected from unplanned bandwidth costs and malicious hackers who may try to break or overload the system 100 by uploading or viewing a large number of images. Additionally, it also protects relatively low bandwidth users (e.g., 28.8 Kbps dialup) from clogging their individual communication path with too many open viewer windows (i.e., viewing images from multiple broadcaster computers). Accordingly, an embodiment of the system 100 may have the ability to collectively limit the overall bandwidth at viewer computer 130 while accommodating additional viewer Webcam sessions (i.e., allow a viewer computer 130 to view images from multiple broadcaster computers).

Figure 8:
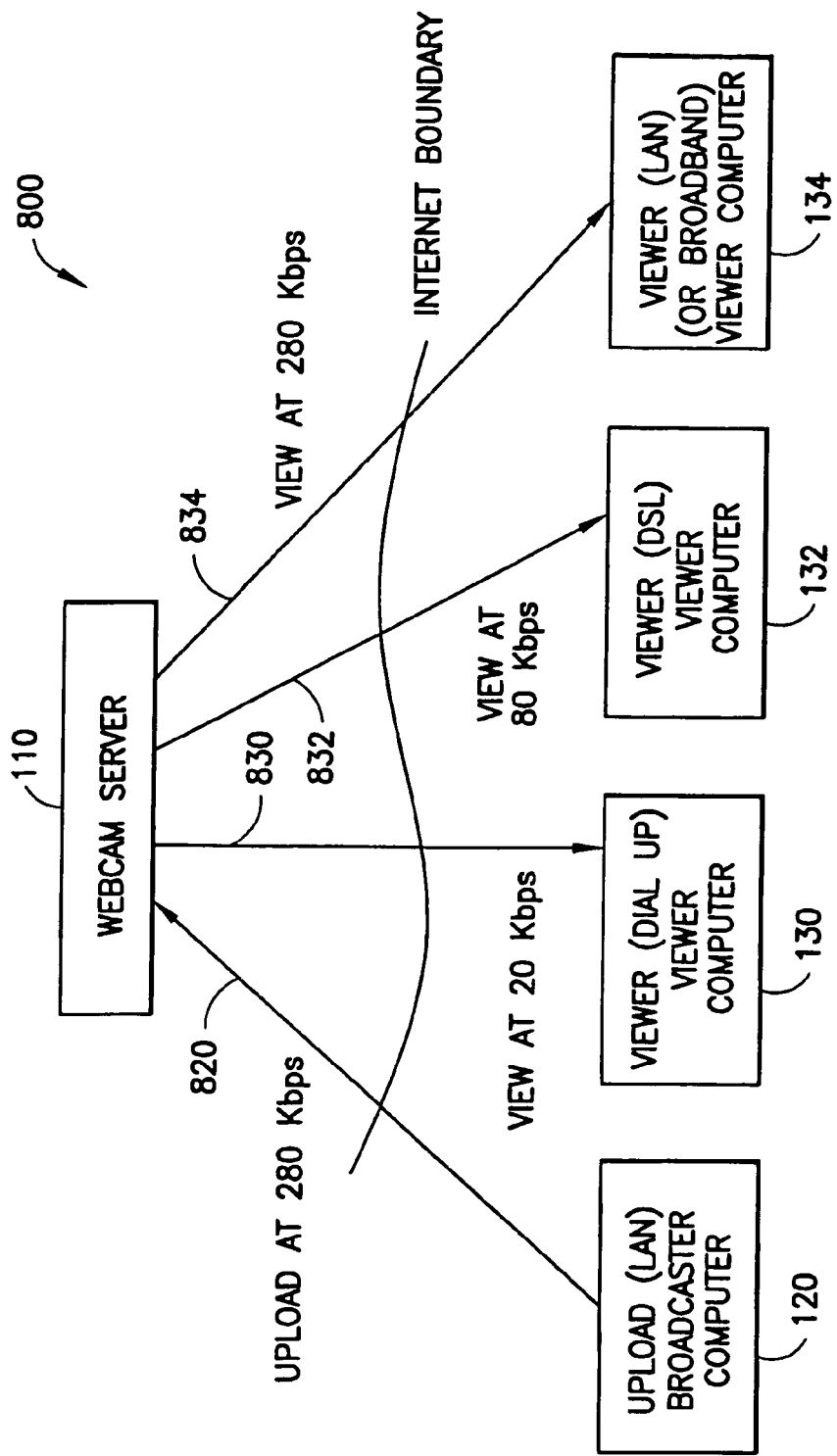
FIG. 8 is a block diagram depicting an exemplary method of providing proportional performance in accordance with the present invention.

Turning to FIG. 8, there is illustrated an embodiment of a process 800 by which system 100 may facilitate proportional performance of various viewer computers 130, 132, 134. In an embodiment of system 100, by a manner described below, when there are multiple viewers and viewer computers 130, 132, 134, communicating over respective communication paths 830, 832, 834, the performance of each viewer computer 130, 132, 134 is in accordance to its infrastructure (or communication path speed) and not the minimum of the whole set. As an example, consider 3 different types of communication paths: a dial-up communication path 830 (smallest bandwidth); a DSL (Digital Subscriber Line) communication path 832 (medium bandwidth); and a LAN or Broadband communication path 834 (maximum bandwidth). If the broadcaster computer 120 is on a LAN or broadband communication path 820 and the three viewer computers 130, 132, 134 are on a dial up 830, DSL 832 and LAN or broadband communication path 134 respectively, then each viewer computer's 130, 132, 134 performance may be in accordance with the relative speed of its communication path 830, 832, 834 (or network connection speed). Specifically, the viewer computer 130 using the dial-up communication path 830 would get the poorest performance, followed by better performance for the viewer computer 132 using the DSL communication path 832, and, finally, the best performance would be achieved by viewer computer 134 using the LAN or broadband communication path 834.

In an embodiment of system 100 and Webcam server(s) 110, the above-described proportional performance may be achieved by implementing throttling mechanisms as described above with respect to graceful degradation and the limiting of bandwidth use.

Figure 13B:
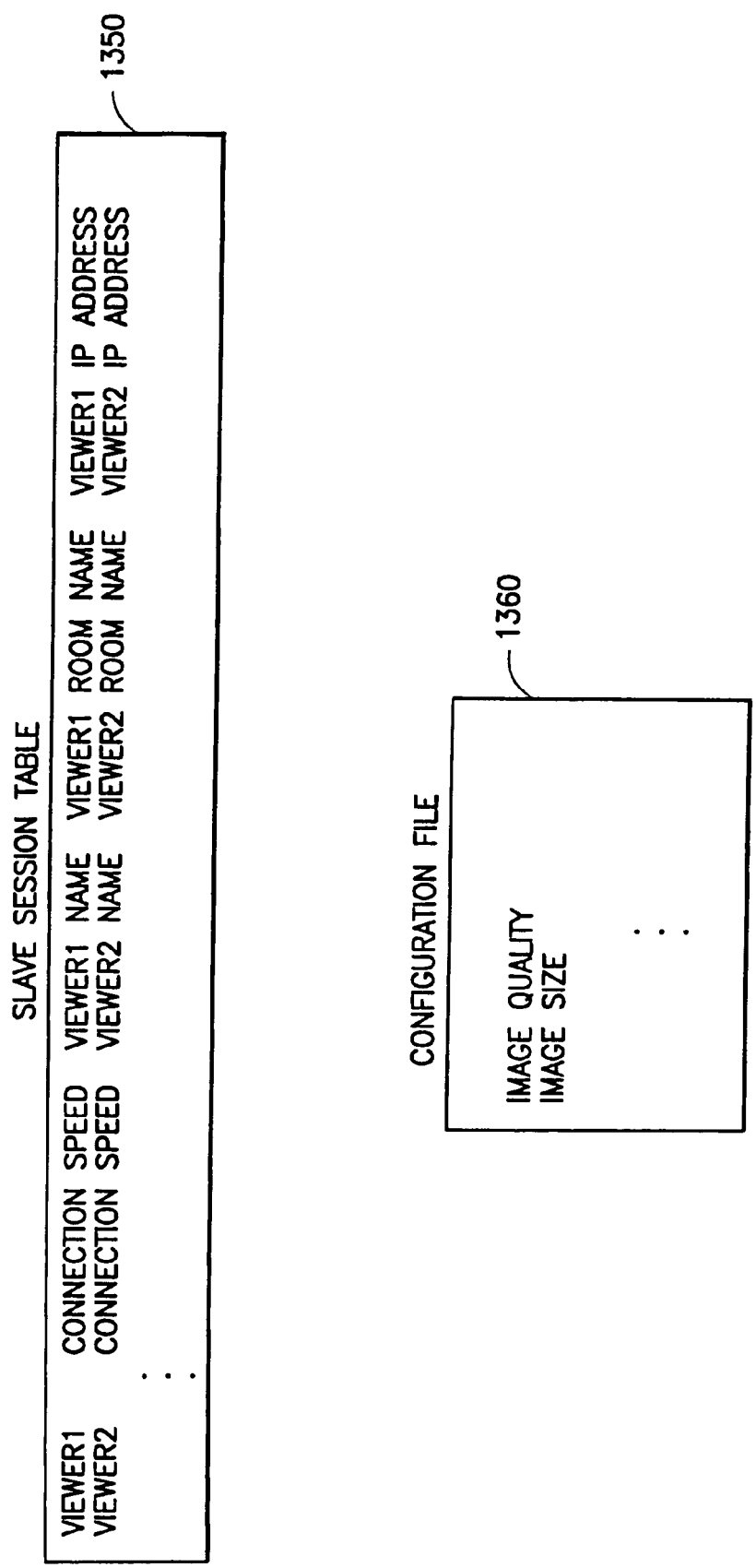
FIG. 13B is a block diagram depicting exemplary data tables in accordance with the present invention.

In such an embodiment, the viewer systems 105 resident on each of the viewer computers 130, 132, 134 may notify the server system 107 resident on Webcam server 110 of the speed of its network connection at the beginning of a Webcam session. This is accomplished by, for example, the viewer system 105 initially storing in memory, as part of viewer system 105, the network speed (as obtained from a network driver on the viewer computer 130). The viewer system 105 then transmits this network speed to server system 107 on Webcam server 110. In an embodiment of the invention, that network speed information is stored at slave session table 1350 (see FIG. 13B) in Webcam server system 107. The slave session table 1350 may reside at Webcam server system 107 at a slave Webcam server, as may master viewer session table 1340 (see FIG. 13A). The slave session table 1350 maintains the list of viewer computers for each broadcaster computer on that slave. For each viewer computer it may store parameters such as, for example, viewer connection speed, viewer name, viewer room name (if they are in a chat room) and viewer IP address. These parameters may be initially transferred from viewer system 105 of each of the viewer computers 130, 132, 134 via respective communication paths 830, 832 and 834.

Each of the viewer computers 130, 132, 134 (via its viewer system 105) notifies the Webcam server 110 of the speed of its network connection (or type of connection) at the beginning of a Webcam session, and the Webcam server system 107 computes the maximum allowable bandwidth for that Webcam session based on an algorithm chosen by the system designers. Such an algorithm may be, for example, a computation of a predetermined percentage of the network connection speed obtained from a viewer computer, or the full speed may be used, or a fixed speed may be assigned depending on the type of network connection, or some other computation may be performed, as a matter of design choice. Thus, for example, a viewer computer 134 using a high bandwidth communication path 834 could have its bandwidth use capped (via an algorithm performed by the server system 107 at Webcam server 110) at 280 Kbps, a viewer computer 132 using a medium bandwidth communication path 832 could have its bandwidth use capped (via an algorithm performed by the server system 107 at Webcam server 110) at 80 Kbps (connection 832) and a viewer computer 130 using a low bandwidth communication path 830 could have its bandwidth be capped (via an algorithm performed by the server system 107 at Webcam server 110) at 20 Kbps, or any other selected or computed values, as a matter of design choice by one skilled in the art based upon the teachings herein. Thus, a high bandwidth viewer computer 134 would likely receive all (or relatively the most) of the transmitted image frames, while a medium bandwidth viewer computer 132 would likely have some number of image frames discarded, and the low bandwidth user 130 would likely have, relatively, the most image frames discarded. The net result is a performance that is related to, and thus optimized for, each underlying communication path (or network connection).

Figure 9:
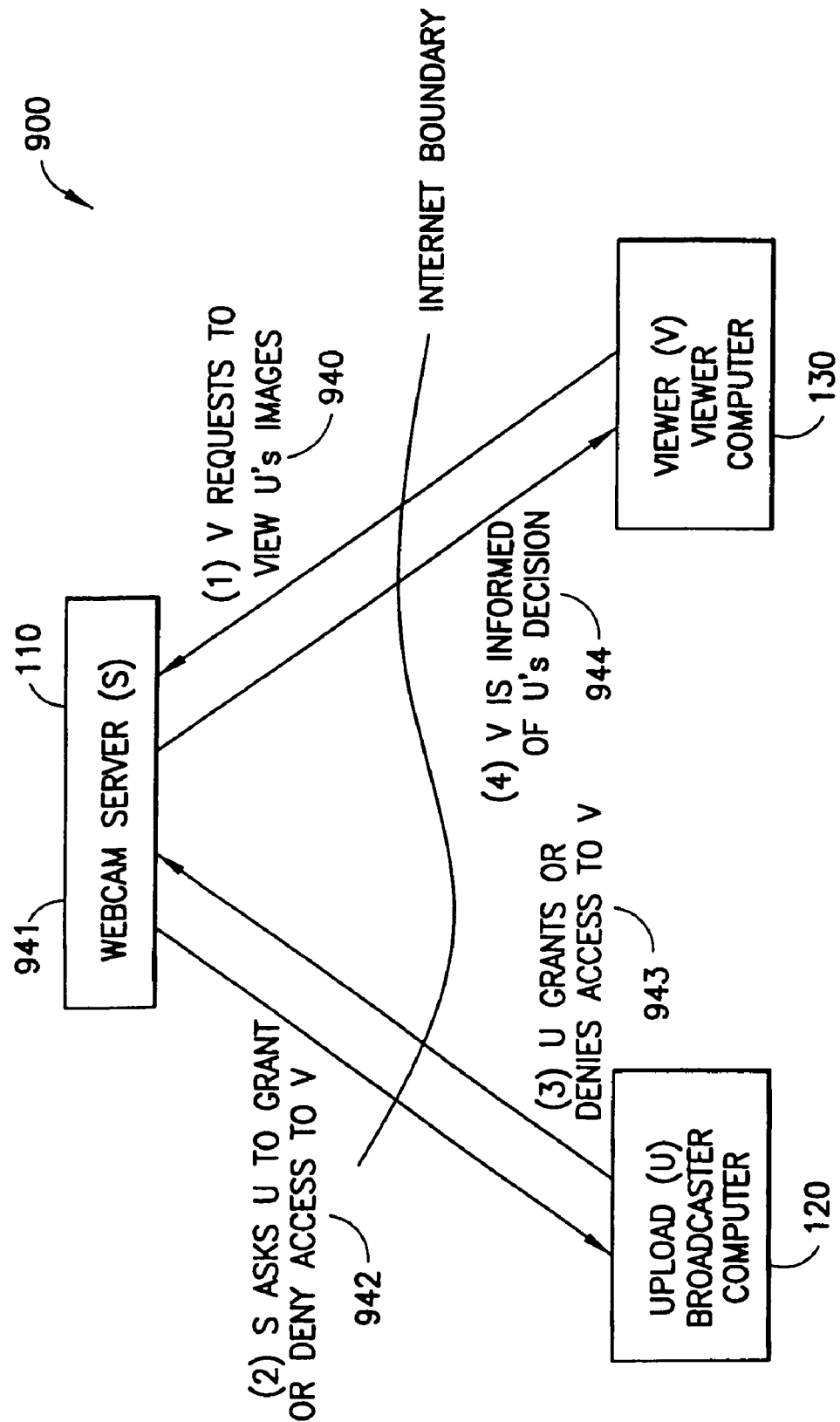
FIG. 9 is a block diagram depicting an exemplary method of providing selective access in accordance with the present invention.

With reference to FIG. 9, there is illustrated an embodiment of a process 900 by which system 100 may facilitate selective access or access control of a Webcam session. In general, selective access provides for the ability of the broadcaster computer 120 (uploader) to control the list of viewers and viewer computers 130, 132 that are given access to images from broadcaster computer 120 for viewing, either automatically or via prompt.

In an embodiment of the system 100, when a viewer computer 130, 132 connects to the Webcam server(s) 110, the viewer computer 130, 132, in step 940, may request to view the images of a specific broadcaster computer 120 (uploader). This step may be accomplished by way of the viewer system 105 of viewer computer 130 transmitting a request from a user to the server system 107 at Webcam server 110. The server system 107 may authenticate the user, in step 941, based on credentials specified by a user at the broadcaster computer 120. The authentification is performed by the server system 107, which compares identification data transmitted from viewer computer 130 to a list of allowed viewers stored in memory at uploader system 102 on broadcaster system 120, and transmitted to server system 107 at Webcam server 110. Webcam server system 107 and Webcam server 110 then determine if the requested broadcaster computer 120 (uploader) is in fact currently broadcasting (by waiting for signals from broadcaster computer 120 for a certain duration of time). In step 942, the Webcam server 110 sends a viewing request to the uploader system 102 at broadcaster computer 120. The user, in step 943, at the broadcaster computer 120 may then decide whether to grant access to the user at the viewer computer 130 or not. The user may make this decision, or selection, by clicking an appropriate button on the user interface that is a part of uploader system 102. Finally, in step 944, the user at viewer computer 944 is informed of the broadcasting user's decision. The decision is transmitted from Webcam server 110 to viewer system 105 on viewer computer 130. The user at viewer computer 130 may see the decision via the user interface that is part of viewer system 105 at viewer computer 130. Additionally, other authentication techniques, such as those based on IP addresses and/or information stored on a "cookie" on a viewer computer 130 may be used.

Figure 14:
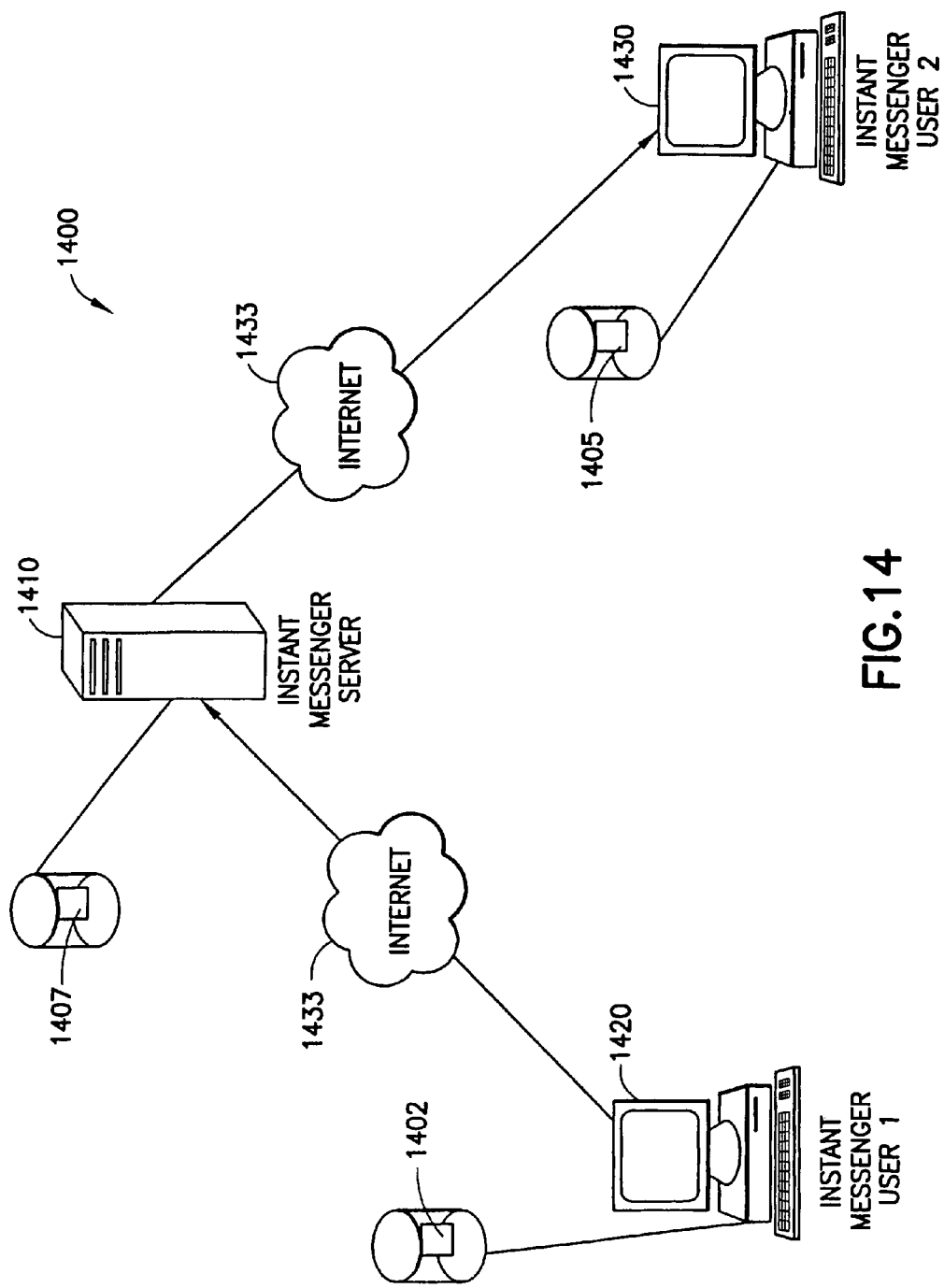
FIG. 14 is a schematic diagram of an overview of a exemplary embodiment of a system architecture of an instant messenger system in accordance with the present invention.

With reference to FIG. 14, and continuing reference to FIG. 1, in an embodiment of the invention, Webcam system 100 may be used in combination with an instant messenger system 1400. Instant messenger system 1400 may comprise one or more instant messenger user computers 1420, 1430, each loaded with an instant messenger system 1402, 1405 loaded thereon; and one or more instant messenger servers 1410 with instant messenger server system 1407 loaded thereon.

Instant messenger user computers 1420, 1430 and instant messenger systems 1402, 1405 may be designed and configured to allow instant messenger users to exchange textual instant messages as is known by those skilled in the art. Instant messenger server 1410 and instant messenger server system 1407 receive instant messages from, for example, instant messenger user computers 1420, via the Internet 1433, and forward those messages to second instant messenger user computers 1430 in a manner as is now known or may become known to those skilled in the art. As is known in the art, instant messenger computer 1420 may be used to send instant messages to instant messenger computer 1430 and instant messenger computer 1430 is also used to send instant messages to instant messenger computer 1420.

In an embodiment of the present invention, where Webcam system 100 is used in combination with instant messenger system 1400, broadcaster computer 120, for example, is loaded with instant messenger system 1402 such that broadcaster computer 120 and instant messenger user computer 1420 are the same computer. Likewise, viewer computer 130 may be loaded with instant messenger system 1405 such that viewer computer 130 and instant messenger user computer 1430 may be the same computer. In an embodiment of the invention, the instant messenger functionality and the Webcam functionality may be integrated into a single software application.

In such an embodiment, for example, a first user can be associated with a first user identifier or ID, an instant message can be associated with the first user ID, and an image can be associated with the first user ID. The instant message is caused to be communicated to the first user based on the first user ID and the image is communicated to the first user based on the first user ID, such that the first user is able to receive both the instant message and image from the second user.

In an exemplary embodiment, however, Webcam server 110 and instant messenger server 1410 may be two or more separate and distinct servers. In an embodiment of the invention, however, the instant messenger server functionality and the Webcam server functionality could reside on a single server.

In an embodiment of the present invention wherein Webcam system 100 may be used in combination with instant messenger system 1400 (see FIG. 14), as described above, users may benefit my enjoying Webcam sessions simultaneously with instant messenger sessions.

In general, a user may download instant messenger user system 1402 to a instant messenger user computer 1420 by making a request at an appropriate Web site, and entering a user ID and password, whereby the appropriate software comprising instant messenger user system 1402 is automatically loaded to instant messenger user computer 1420.

Figure 15:
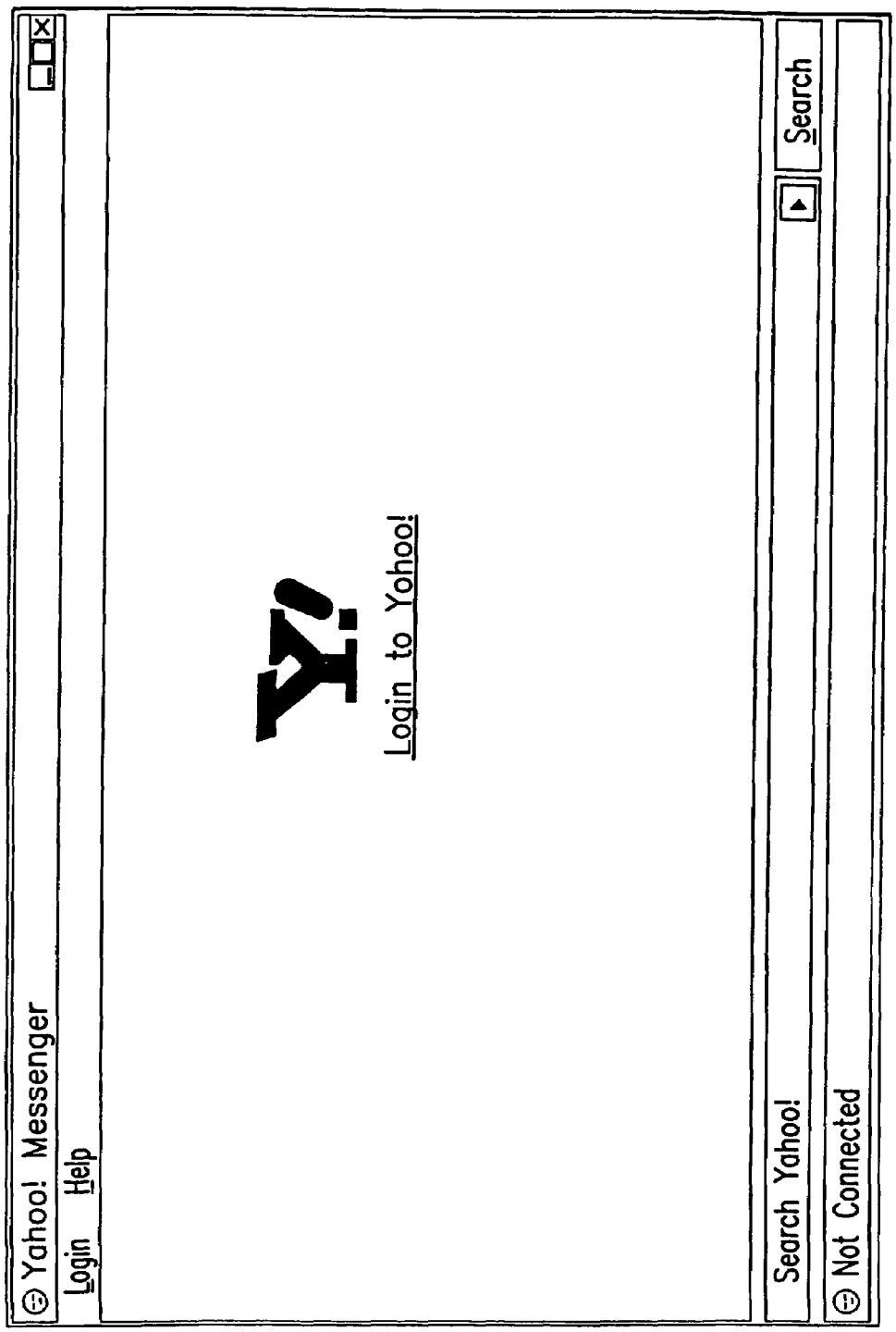
FIG. 15 is an exemplary screen shot in accordance with the present invention.
Figure 16:
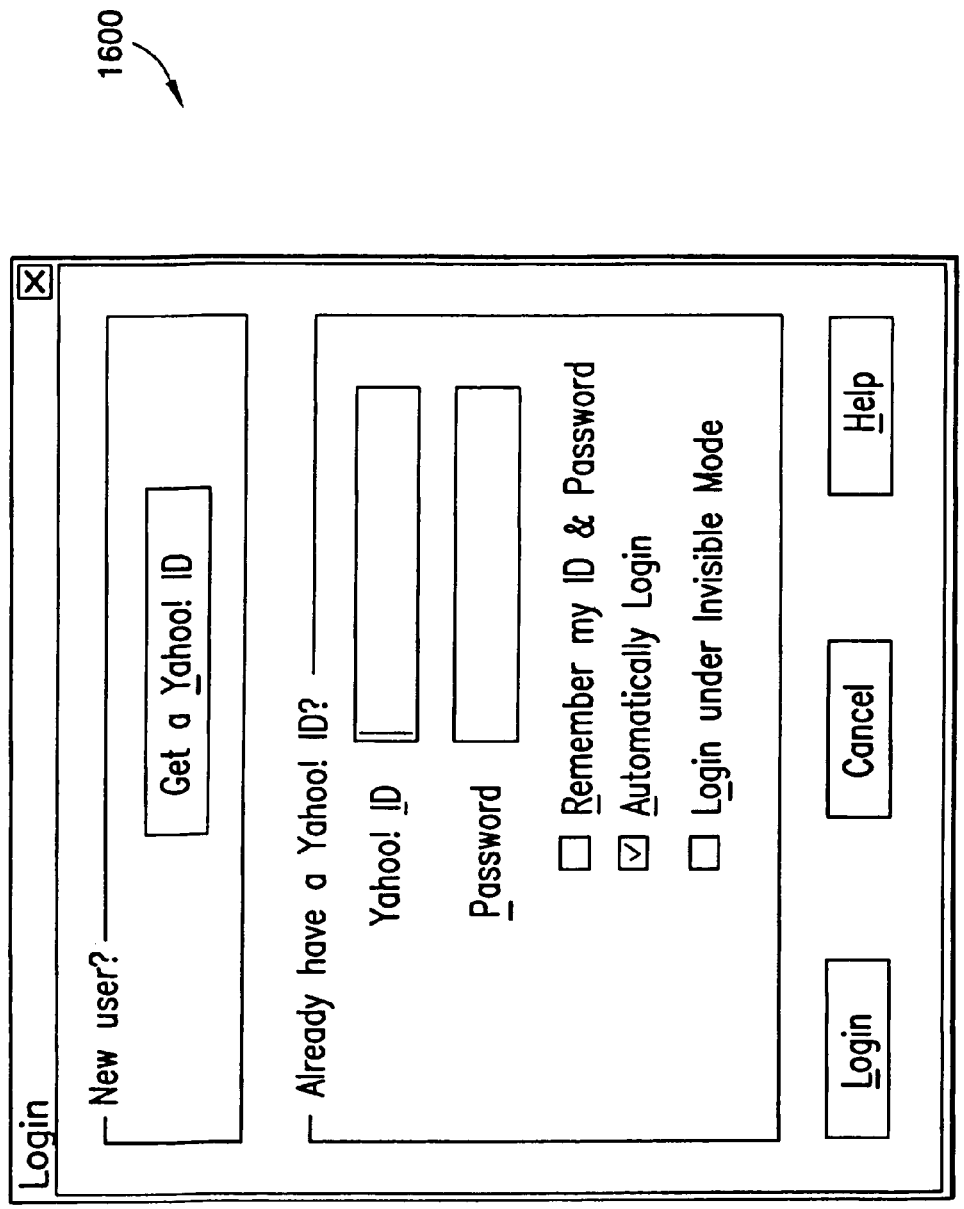
FIG. 16 is an exemplary screen shot in accordance with the present invention.
Figure 17:
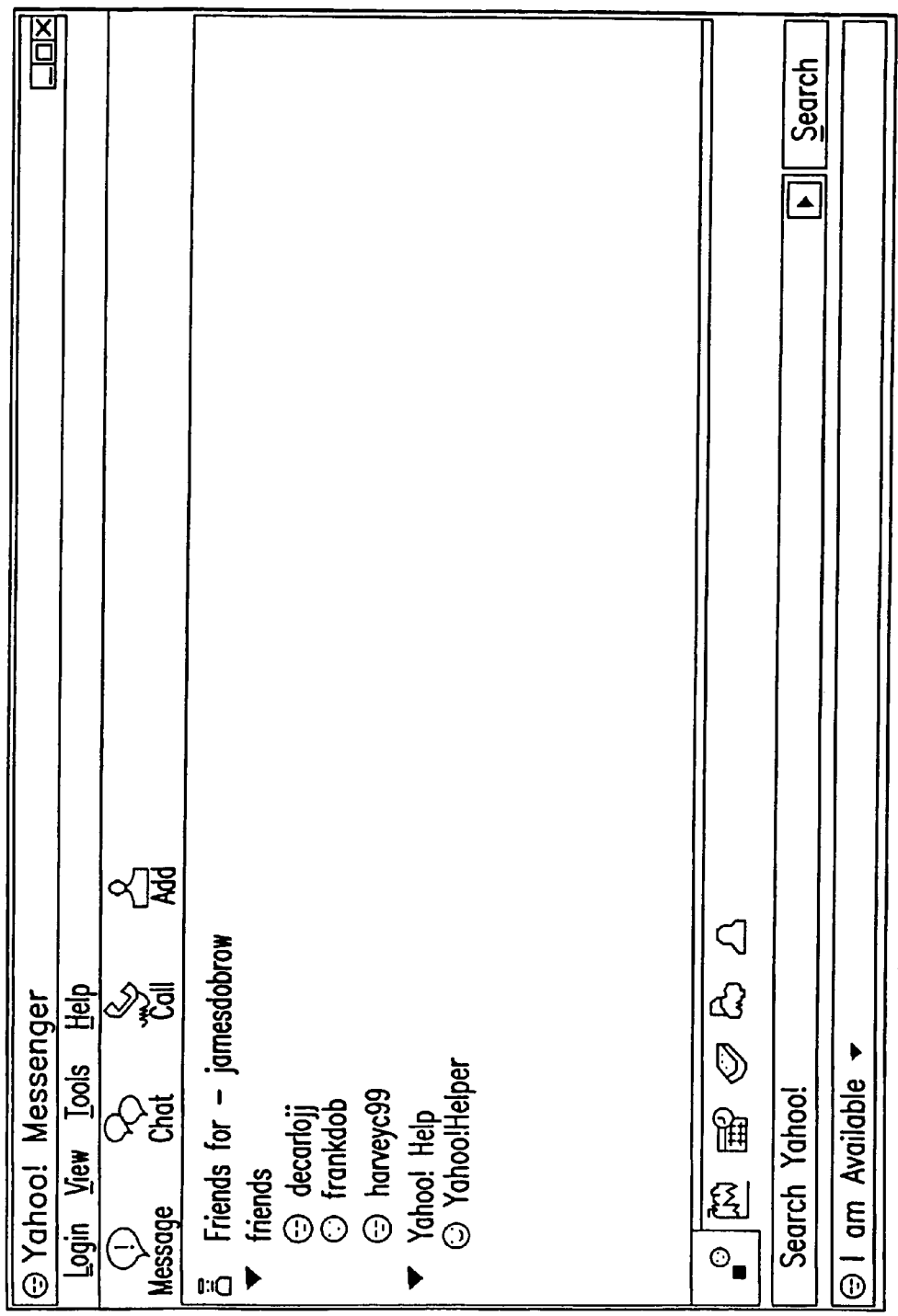
FIG. 17 is an exemplary screen shot in accordance with the present invention.
Figure 18:
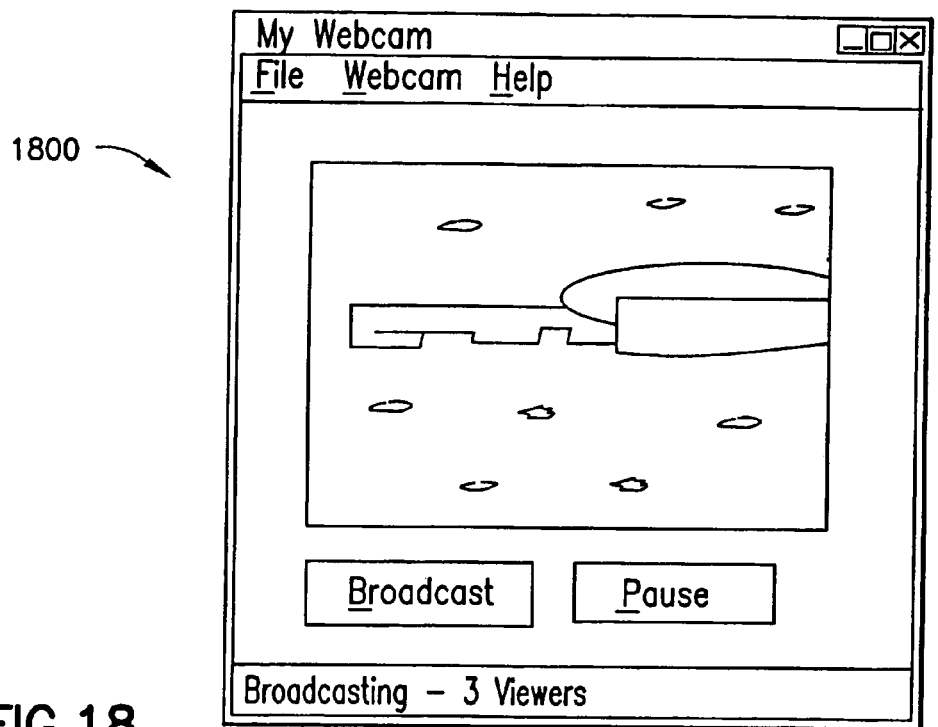
FIG. 18 is an exemplary screen shot in accordance with the present invention.

Once instant messenger user system 1402 is loaded on to instant messenger user computer 1420, the user may click on an appropriate icon to display, with reference to FIG. 15, an introductory instant messenger screen 1500. By choosing the "login" option, with reference to FIG. 16, instant messenger login screen 1600 may be displayed. At this point, the user may enter the appropriate ID and password, and, if authentication as discussed above is achieved, and with reference to FIG. 17, instant messenger status screen 1700 may be displayed. By viewing instant messenger status screen 1700, the user may determine, for example, the online status and instant messenger availability of selected friends of the user. In an embodiment of the invention, the user may select, from the "tools" menu, the option "view my Webcam." If camera/video device 103 (see FIG. 1) is properly coupled to instant messenger computer 1420 (which, in this example, also may serve as broadcaster computer 120 (see FIG. 1)) (If the camera/video device 103 is not properly coupled to instant messenger computer 1420, then an error message may be displayed). At this point, with reference to FIG. 18, the "my Webcam" screen 1800 may be initiated, which allows the user to view images from the broadcaster computer's 120 own camera/video device 103. This step allows the user to view his or her own image and inspect, for example, the image quality, lighting, and camera angle the user's particular Webcam setup. As described herein, the term "screens" may also denote a "window" such that multiple screens or "windows" may be viewed by the user simultaneously, as is known by those skilled in the art.

Figure 19:
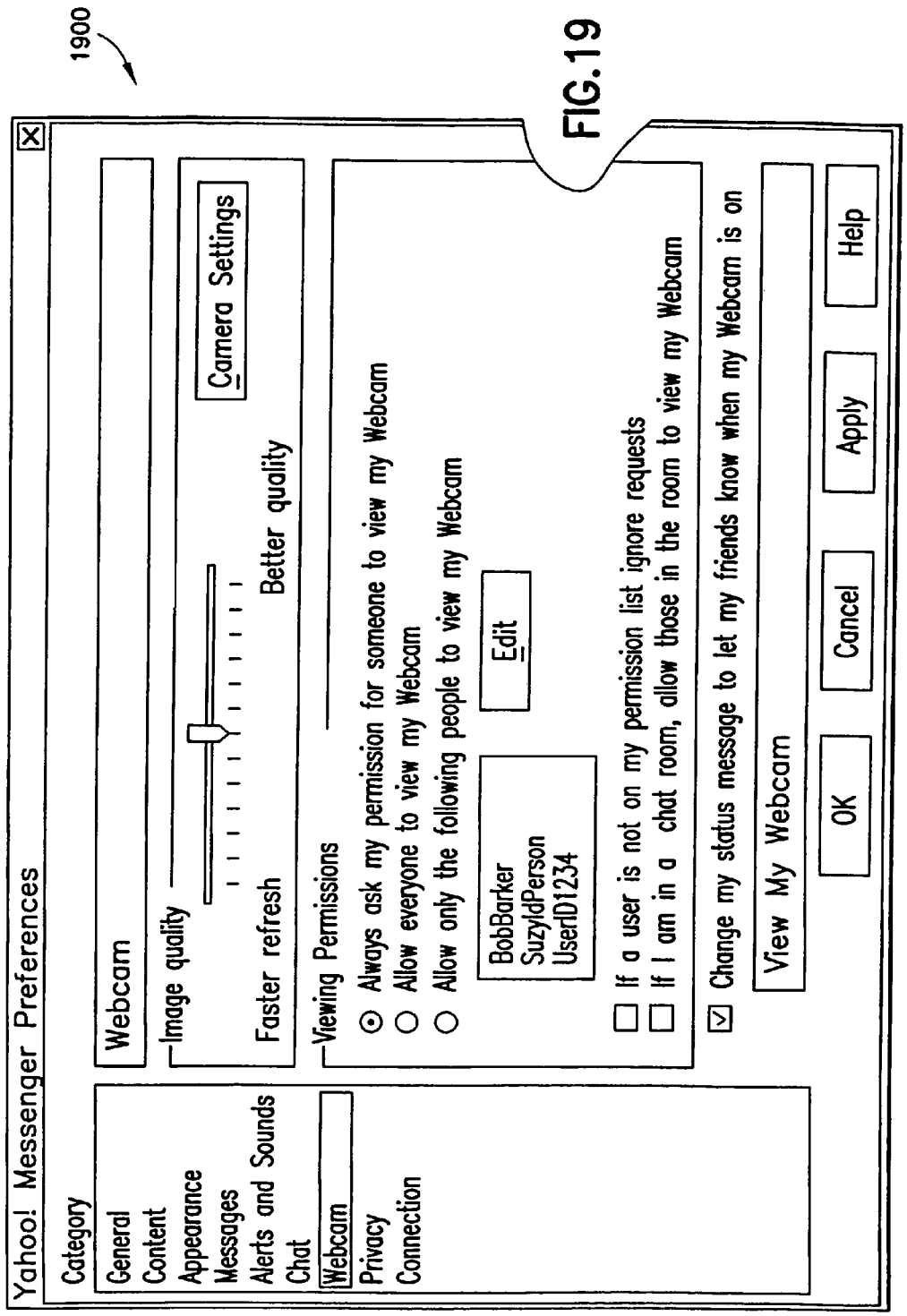
FIG. 19 is an exemplary screen shot in accordance with the present invention.
Figure 20:
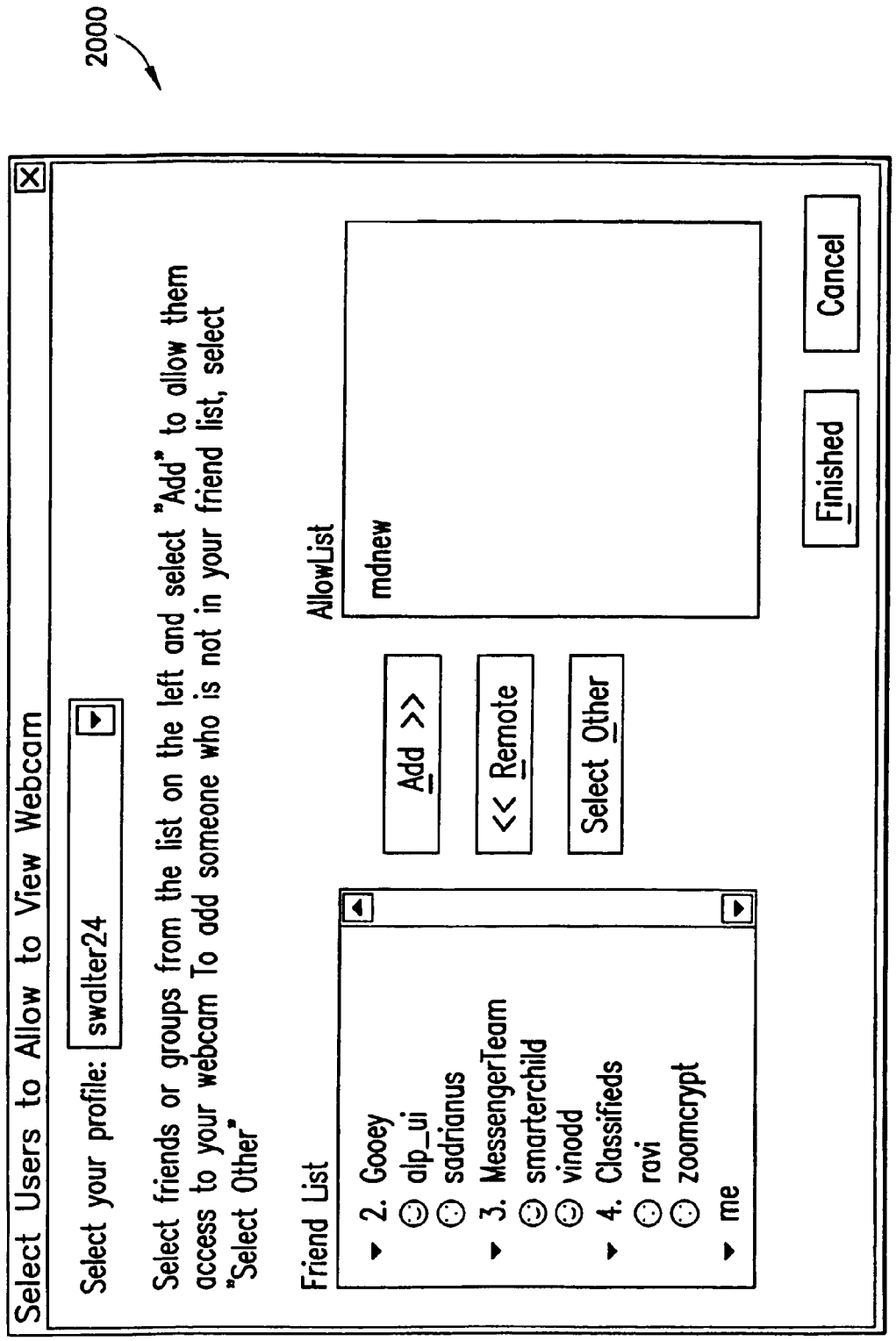
FIG. 20 is an exemplary screen shot in accordance with the present invention.

The user may select "login" and "preferences" from the instant messenger status screen 1700 to initiate and view, with reference to FIG. 19, preferences screen 1900. From preferences screen 1900, a user may select a specific category, such as, for example, "Webcam" for which to adjust preferences. Preferences are default settings for certain parameters related to the instant messenger and Webcam sessions. Examples of preferences that may be adjusted include the selection between faster image refresh rate and better image quality; whether to always ask the user's permission before allowing another user to view the uploaded images, allow all who request to view the uploaded images, or to allow only those listed on a specific list to be allowed to view the uploaded images. Additional parameters may also be adjusted and set as "preferences" from preferences screen 1900. If the user selects the option "allow only the following people to view my Webcam," the user may choose to edit the allowed list, with reference to FIG. 20, via the "select users to allow to view Webcam" screen 2000. From this screen, the user may select other users from a "friend list" to be added or deleted from an "allow list."

Figure 21:
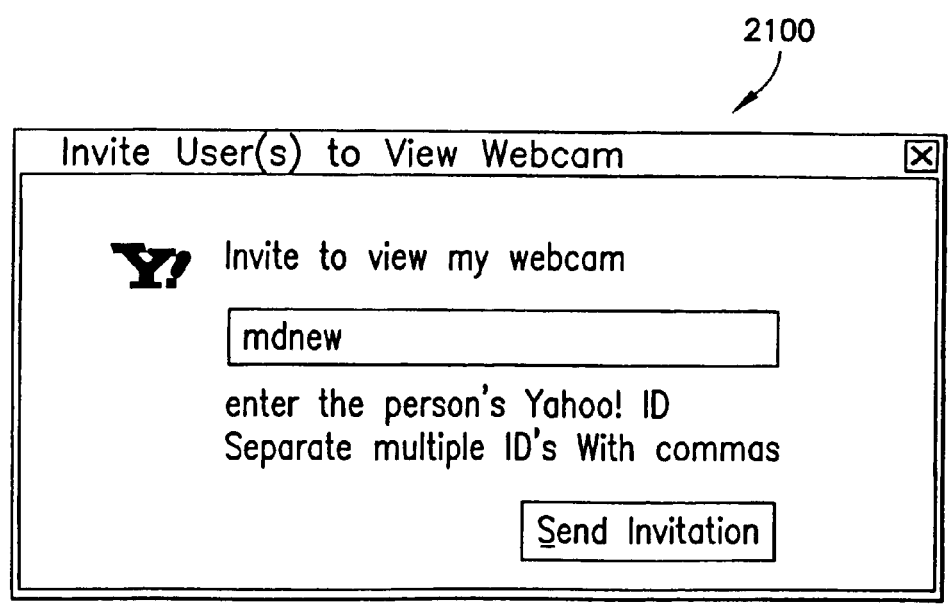
FIG. 21 is an exemplary screen shot in accordance with the present invention.

Furthermore, from the "tools" menu, the user may invite another user to view the uploaded images of the broadcaster computer 120. With reference to FIG. 21, an exemplary screen for inviting another user to view the uploaded images is shown. From this screen, other users may be invited to view uploaded images by typing in the other users' IDs into an appropriate field.

Figure 22:
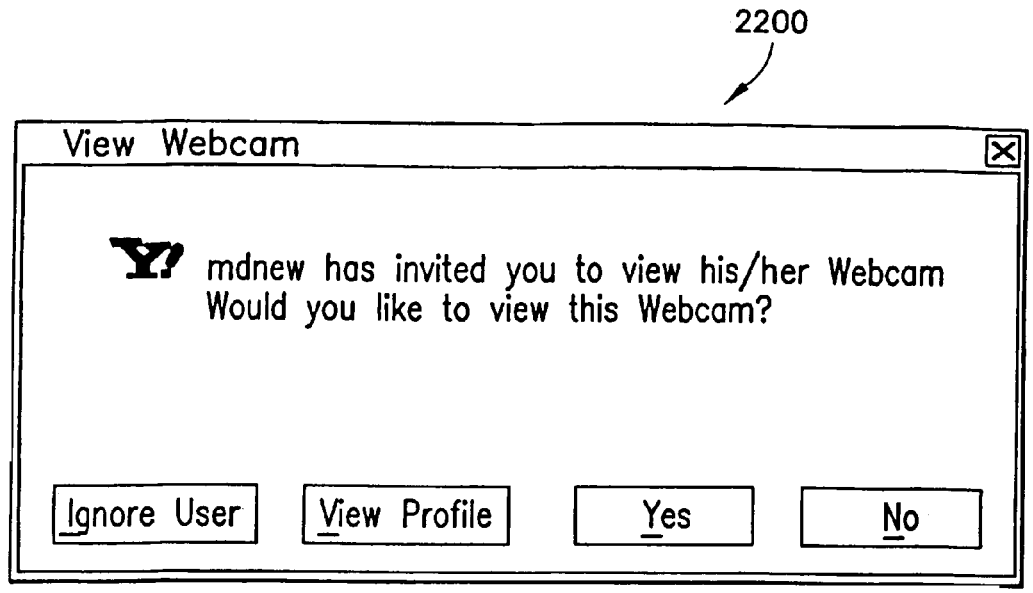
FIG. 22 is an exemplary screen shot in accordance with the present invention.
Figure 23:
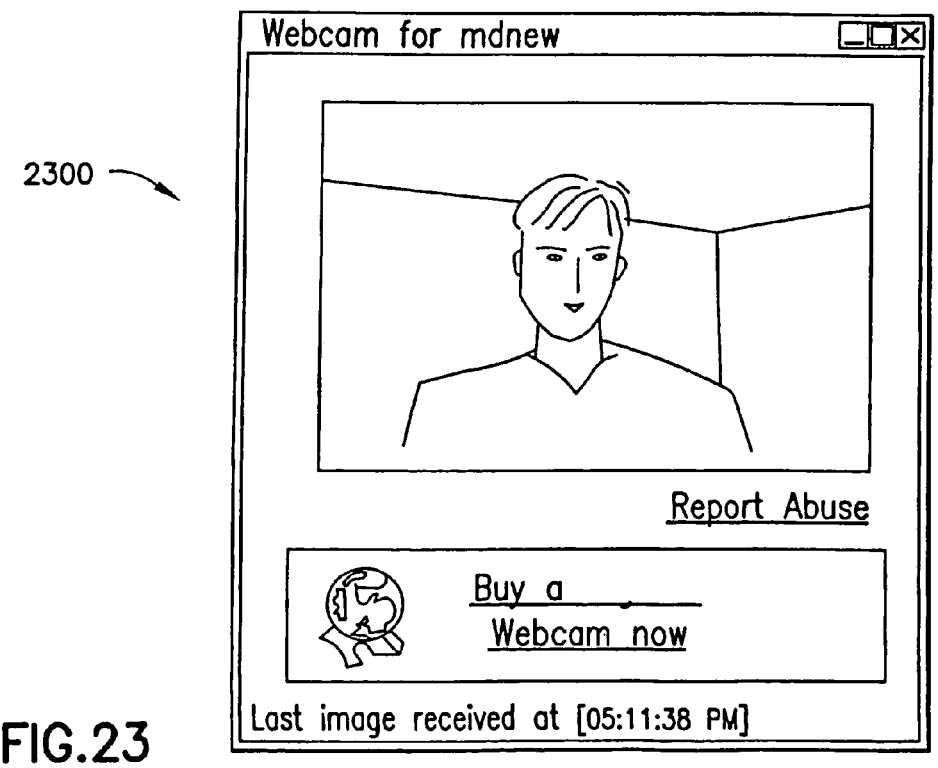
FIG. 23 is an exemplary screen shot in accordance with the present invention.

When the user at the broadcaster computer 120 invites another user at a viewer computer 130 to view the uploaded images from the broadcaster computer 120, the user at the viewer computer, with instant messenger system 1405 loaded thereon, views a Webcam invitation screen 2200 displaying the invitation, as can be seen in FIG. 22. If the user at viewer computer 130 selects "yes," thus accepting the invitation, and with reference to FIG. 23, a Webcam viewer screen 2300 is displayed. Webcam viewer screen 2300 allows the user at viewer computer 130 to view the uploaded images from camera/video device 103 of the broadcaster computer 120.

Figure 24:
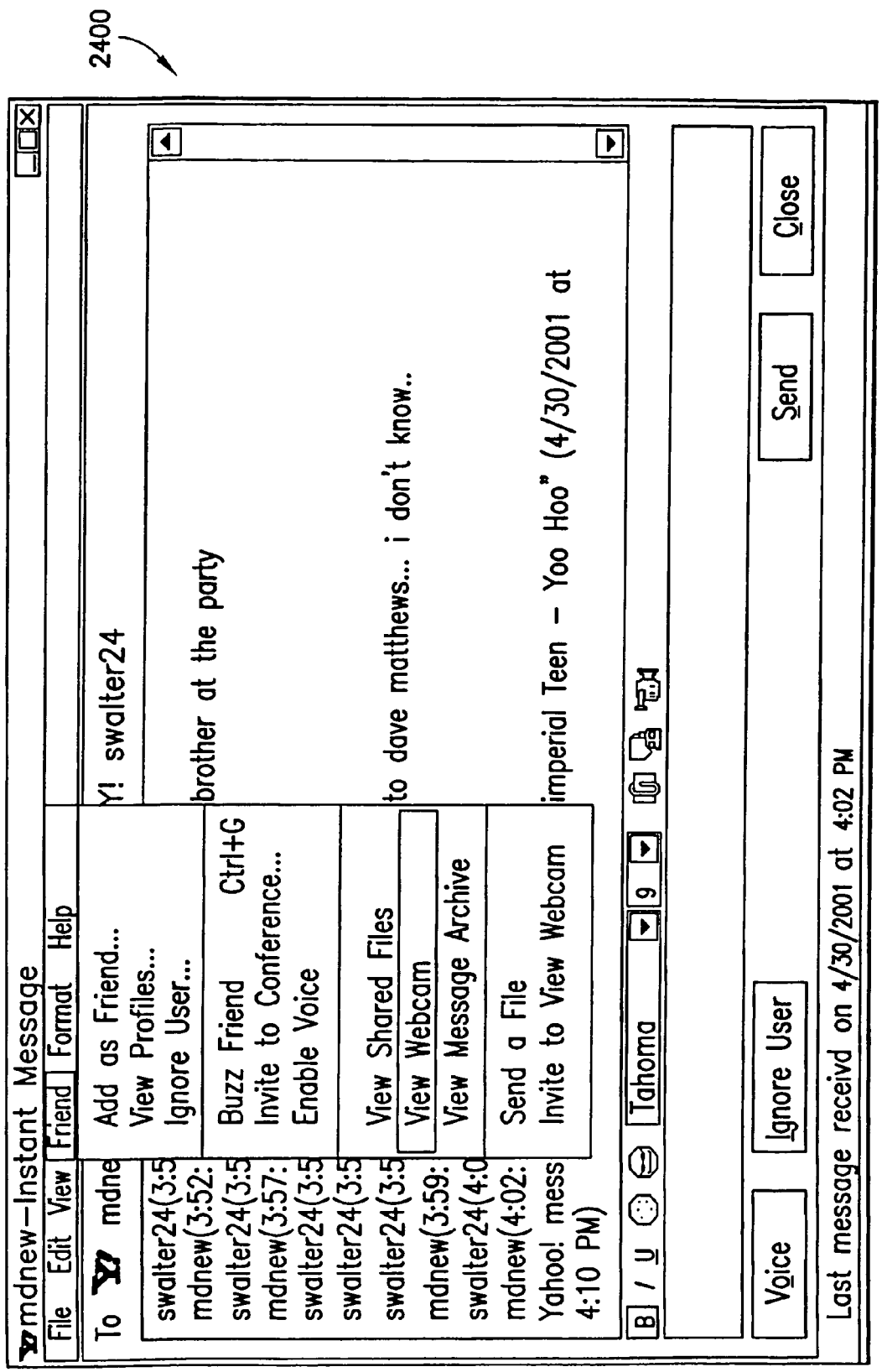
FIG. 24 is an exemplary screen shot in accordance with the present invention.
Figure 25:
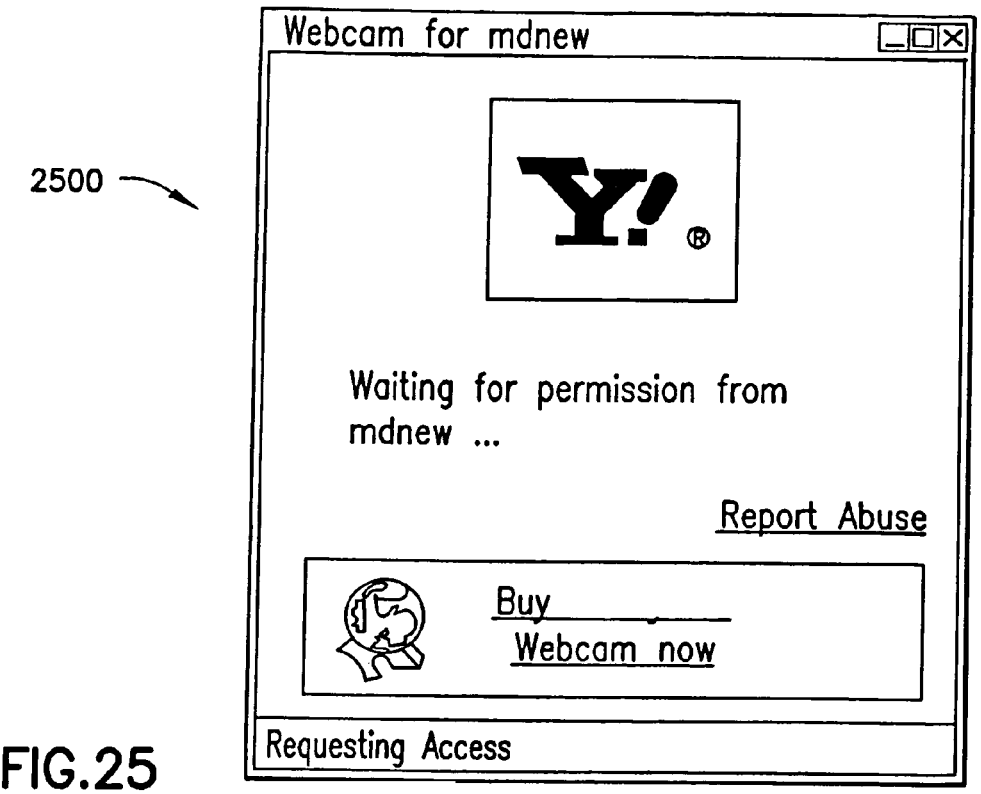
FIG. 25 is an exemplary screen shot in accordance with the present invention.
Figure 26:
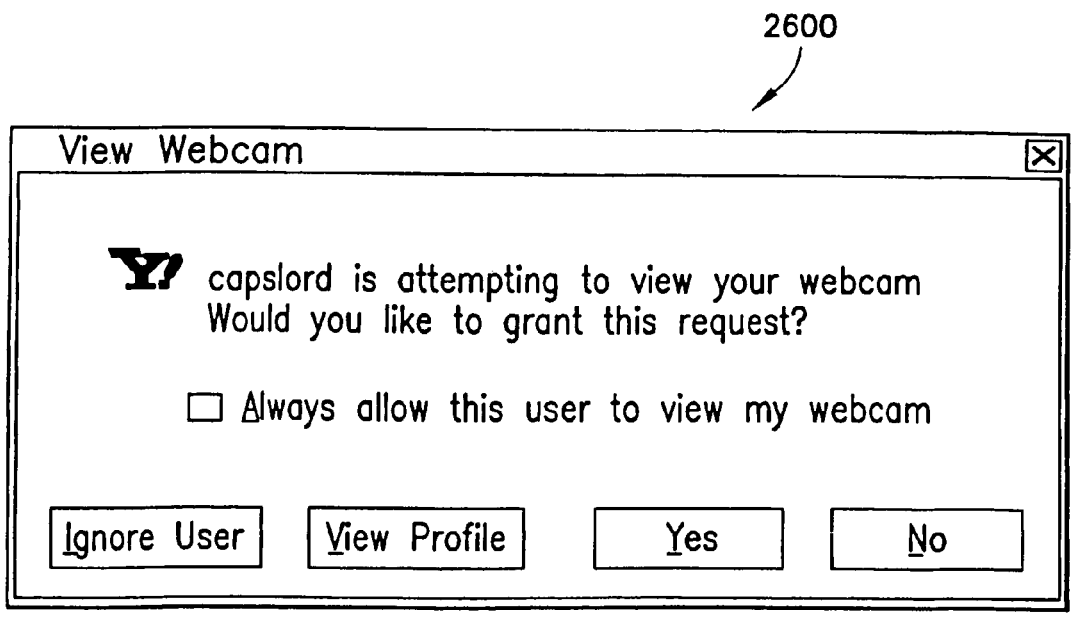
FIG. 26 is an exemplary screen shot in accordance with the present invention.

The user at viewer computer 130 may also select the "view friend's Webcam" option to initiate and view the "view friend's Webcam" screen 2400, as is illustrated in FIG. 24. From "view friend's Webcam" screen 2400, a user may select the ID of another user for viewing. If, however, the selected broadcaster has not selected the user who requested viewing for having automatic permission to view, then the user requesting to view must wait for permission to view from the user at the broadcaster computer. While waiting for permission, in an exemplary embodiment of the system, the requesting viewer will view "waiting for permission" screen 2500, as illustrated in FIG. 25. In turn, the user at the broadcaster computer 120 whose permission to be viewed is requested will view a "grant permission" screen 2600, as is illustrated in FIG. 26.

Figure 10:
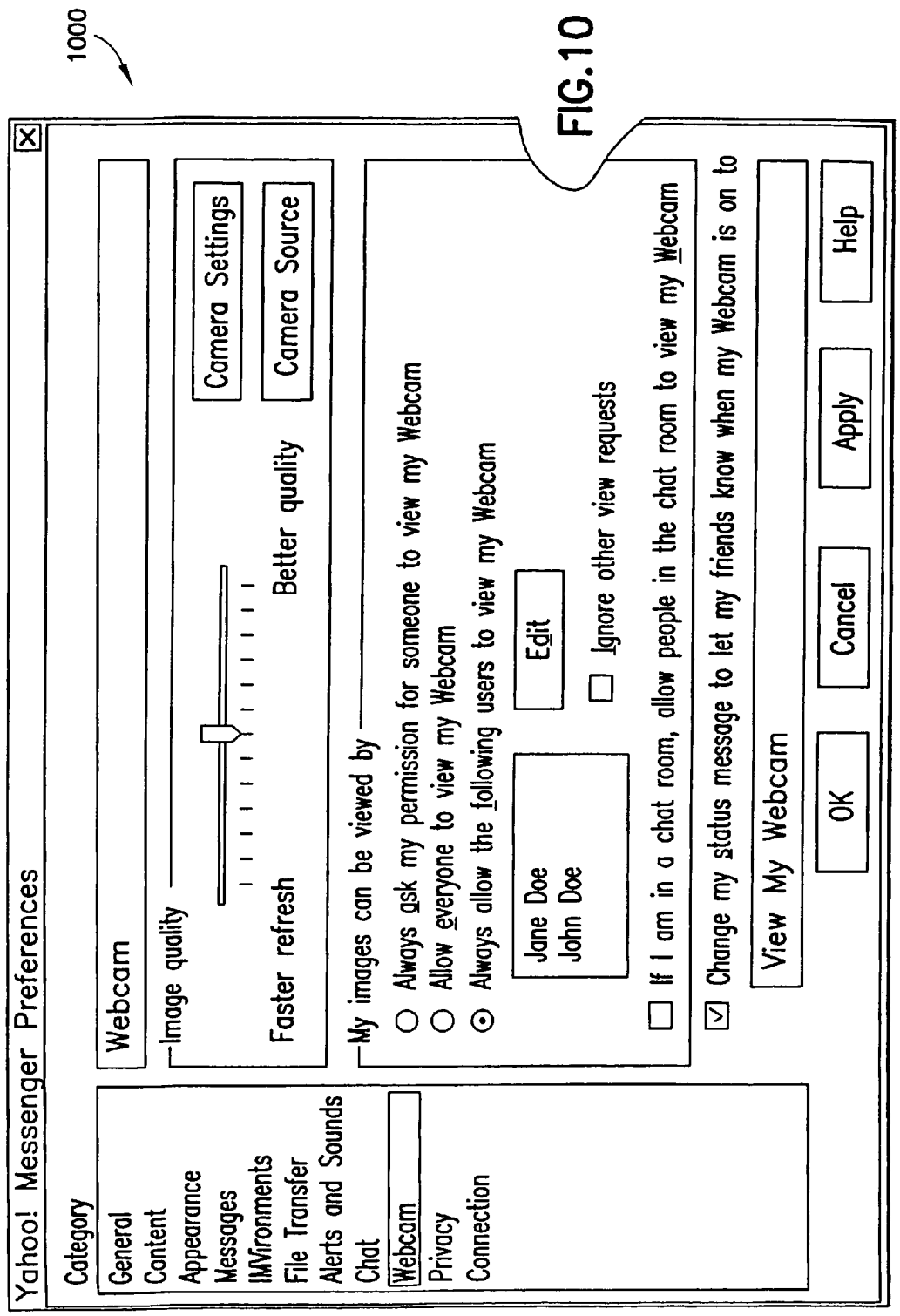
FIG. 10 is an exemplary screen shot of a preference dialog box in accordance with the present invention.

An embodiment of an instant messenger preferences dialog box in accordance with an embodiment of the present invention is illustrated in FIG. 10. In an embodiment of the invention, the preferences are certain default settings of parameters related to a Webcam session, as may be chosen and/or modified by the user. An instant messenger dialog box 1000 may have several preferences that allow various levels of automated handling of viewing requests. First, the uploader can choose to allow blanket access to all users. Next, the uploader may allow access to only the specified list of friends by specifying their IDs. If a viewing request if not from a friend in that list, the instant messenger system can either prompt the user for action or deny the request based on the selected preferences. Next, the uploader can be prompted for all viewing requests thereby turning off any automated handling of requests. In addition, it is possible for the uploader client to maintain lists of friends to always be ignored.

The chosen preferences information preferably remains persistent across sessions and independent of the actual machines used, by saving these preferences in a central persistent server, such as, for example, Webcam server 110. In an embodiment of the invention, these parameters may be stored in universal database 1310 (see FIG. 13A), discussed above. Thus a user logging in to the system from any computer equipped with the necessary software will achieve the same functionality, as expressed by that user's selected preferences, as if that user were at his or her own computer.

Furthermore, the broadcaster computer may also display a viewer list. A viewer list allows the broadcaster (uploader) to see the list of all viewers watching that broadcaster at any given instance, along with a total viewer count. Preferably, every time a viewer begins viewing, the uploader is informed of the ID of the viewer and the total count of viewers. This information is also preferably updated when a viewing session is terminated.

Figure 11:
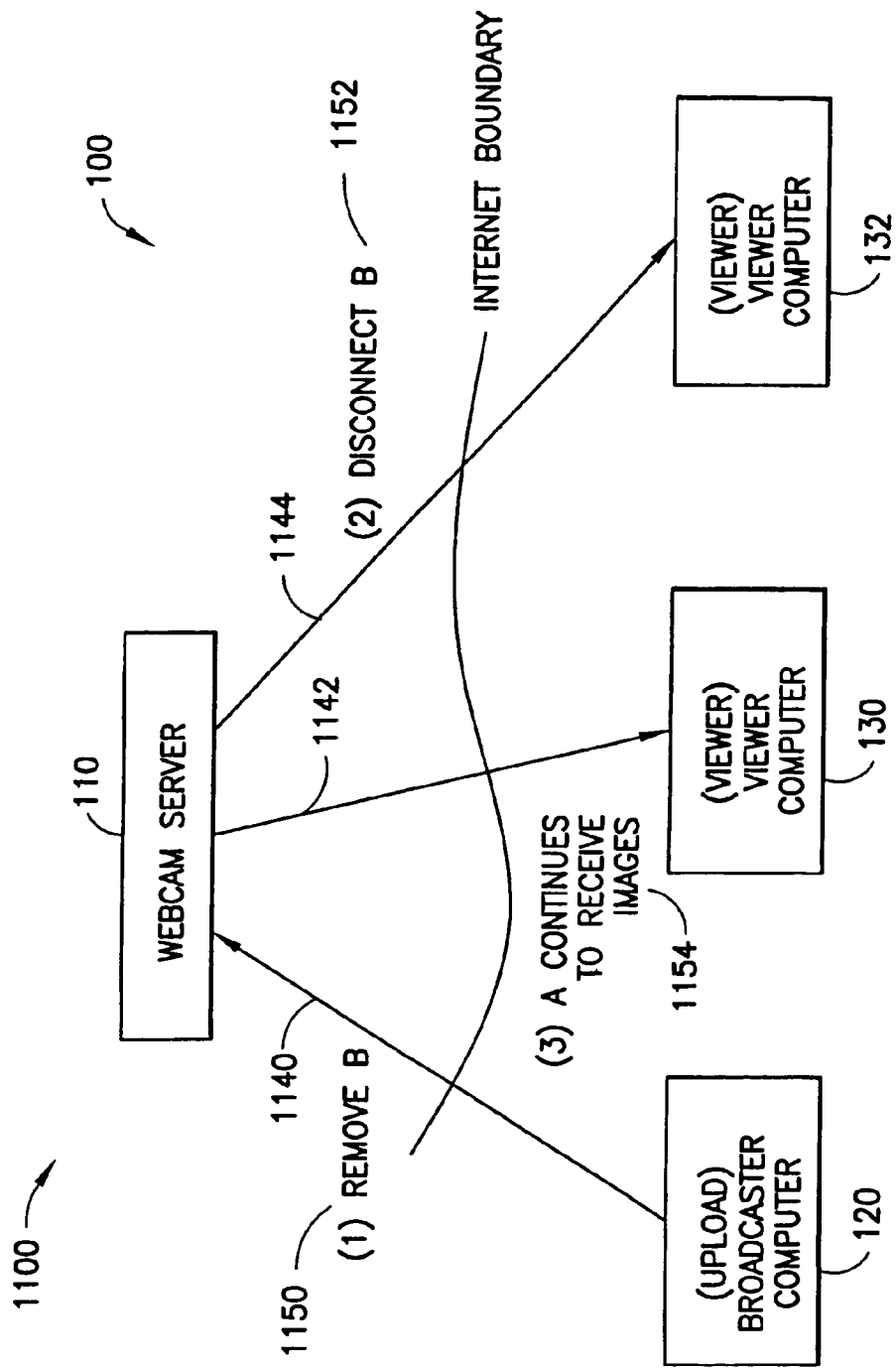
FIG. 11 is a block diagram depicting an exemplary method of providing selective removal of a viewer in accordance with the present invention.

With reference to FIG. 11, there is illustrated an embodiment of a process 1100 by which system 100 may facilitate selective removal of viewer computers 130, 132. Generally, selective removal, as defined herein, is the ability for a broadcaster (uploader) to selectively remove a viewer, possibly from a list of viewers who are watching, without terminating the Webcam session. This gives the uploader full control of who may view uploaded images.

In process 1100, a user may be uploading images from broadcaster computer 120 to Webcam server 110 via communication path 1140, which are in turn fetched by first user computer 130 via communication path 1142 and second user computer 132 via communication path 1144. Next, in step 1150, if a user at broadcaster computer 120 selects to remove second viewer computer 132 from the Webcam session, uploader system 102 on broadcaster computer 120 forwards a removal message to server system 107 on Webcam server 110. Server system 107, in step 1152, then communicates with viewer system 105 on second viewer computer 132 and forwards a message to disconnect second viewer computer 132 from the Webcam session. First viewer computer 130, in step 1154, however, remains as part of the Webcam session as viewer system 105 on first viewer computer 130 continues to fetch images from server system 107 as they continue to be persistently uploaded from broadcaster computer 120.

Because the Webcam session of the broadcaster computer 120 is not terminated in step 1152, the first viewer computer 130 does not have to reconnect to the Webcam session. Accordingly, an embodiment of the present invention allows a broadcaster computer 120 to selectively terminate one viewer while maintaining connections with other viewers.

The uploader system 102 preferably maintains a list of viewers currently viewing at any given time, which list may reside at broadcaster computer 120 in part of uploader system 102. The uploader system 102 on broadcaster computer 120 transmits a particular user identifier, from the user list that resides in uploader system 102. A benefit of selective removal of viewers is that the whole process is transparent to all unaffected entities (such as additional viewers) while providing full control of who may view uploaded images to the broadcaster (uploader).

Figure 12:
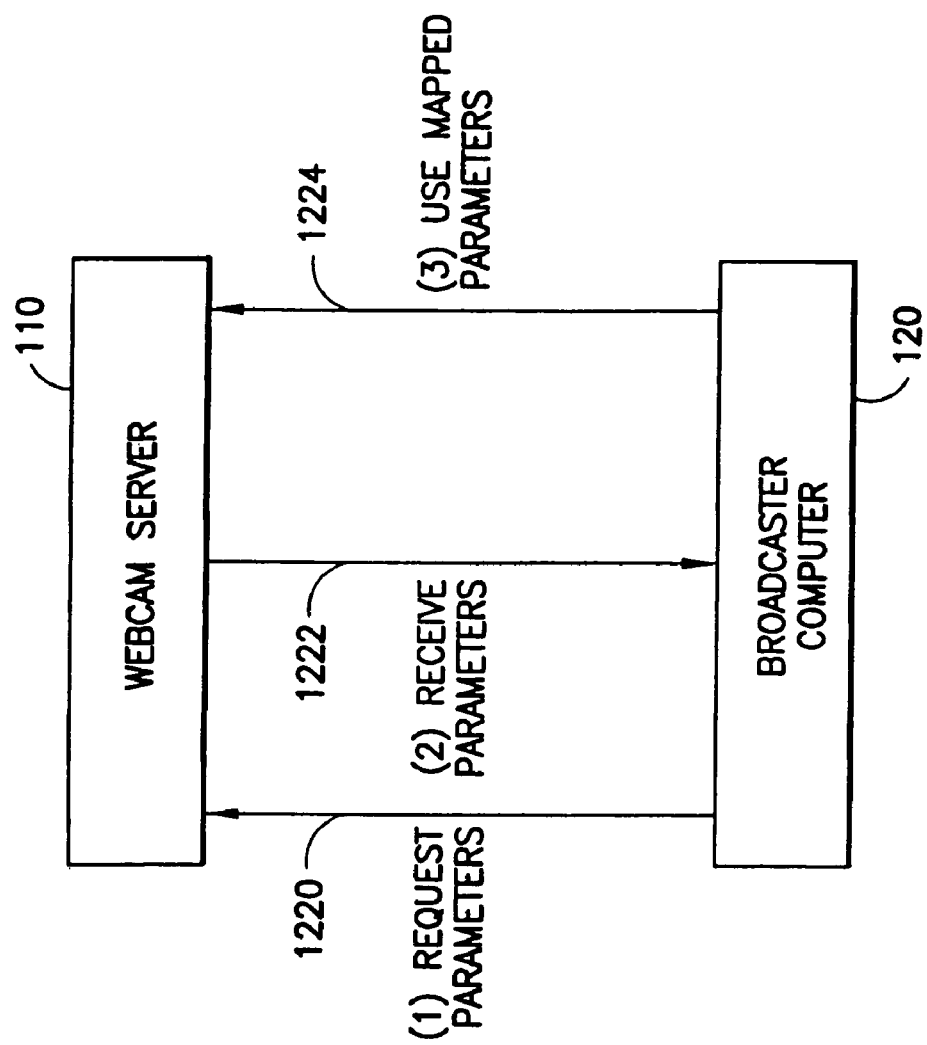
FIG. 12 is a flow diagram depicting an exemplary method of providing dynamic settings in accordance with the present invention.

An embodiment of a process by which system 100 may facilitate dynamic parameter setting is illustrated in FIG. 12. As described herein, dynamic parameter setting, generally, is the ability to store a user's preferred parameter settings at Webcam server 110, and transmit those settings to a user computer, such as broadcaster computer 120, at the beginning of a Webcam or instant messenger session.

For example, a user may choose a setting, such as, for example, image resolution, by selecting a slider value between 0 and 10 (see FIG. 10). With continued reference to FIG. 12, at the beginning of each broadcasting session, in step 1220, when a broadcasting user initiates a Webcam session at broadcast computer 120, and uploader system 102 requests a list of parameters associated with the particular user based on the user ID. The user parameters may be stored in a configuration file 1360 (see FIG. 13B) residing at Webcam server 110. These parameters may be read from Webcam server 110 by uploader system 102 of broadcaster computer 120 at the beginning of a Webcam session. The requested parameters may include, for example, the Webcam image resolution. The uploader computer 120, in step 1222, may then receive the requested parameters and commence a Webcam session using the preferred parameters. If a user, via the user interface, changes a parameter setting, the new parameter value is transmitted from the broadcaster computer to the server computer 110 and configuration file 1360 is updated accordingly.

While the invention has been described in conjunction with certain embodiments thereof, various modifications and substitutions can be made thereto without departing from the spirit and scope of the present invention. The invention has only also been described with reference to examples, which are presented for illustration only, and thus no limitation should be imposed. Accordingly, the scope of the present invention is to be governed by the claims appended hereto.

What is claimed is:

1. A method comprising:
associating a first user with a first user ID;
associating an instant message with the first user ID;
associating an image with the first user ID;
causing the instant message to communicate to the first user from a second user based on the first user ID;
causing the image to communicate to the first user from the second user based on the first user ID;
wherein the first user receives both the instant message and image from the second user, the image being communicated at a frame rate and at an image quality, at least one of said frame rate and said image quality being based upon conditions of a communication path between said first user and said second user, said frame rate being scalable in accordance with a number of dropped frames depending on whether a previous image has been received; and wherein said frame rate is scalable at least in part by dropping at least some frames such that said dropped frames are not sent to said first user;
wherein the second user uses a broadcaster computer and the first user uses a first viewer computer, the method further comprising: receiving a request to initiate one or more server connections between the broadcaster computer and the first viewer computer, the one or more server connections are for passing the image; facilitating a peer-to-peer connection between the broadcaster computer and the first viewer computer, the peer-to-peer connection is for passing the image; facilitating communication of the image over the peer-to-peer connection instead of the server connections; and wherein a third user uses a second viewer computer comprises: passing a request to view the image from a second viewer computer to the broadcaster computer; and facilitating the reestablishing of a first server connection between the broadcaster computer and the first viewer computer for passing the image in response to receiving the second viewer computer request; and facilitating a second server connection between the broadcaster computer and the second viewer computer for passing the image.

2. The method of claim 1, further comprising:
receiving control data for the image from the broadcaster computer.

3. The method of claim 1, wherein the reestablishing is in response to the broadcaster computer receiving approval from the second user.

4. The method of claim 3, wherein the third user is on an approved list.

5. The method of claim 1, further comprising:
maintaining the peer-to-peer connection during existence of the server connection to the second viewer computer;
terminating the second server connection; and
facilitating the passing of the image over the peer-to-peer connection in response to termination of the second server connection.

6. The method of claim 1, further comprising:
associating a second user ID with the second user;
wherein causing the instant message to be communicated to the first user is further based on the second user ID.

7. A method comprising:
initiating one or more server connections between a broadcaster computer and a first viewer computer via one or more application servers, the one or more server connections for passing an image and an instant message, the image being communicated at a frame rate and at an image quality, at least one of said frame rate and said image quality being based upon conditions of a communication path between said first viewer computer and said broadcaster computer, said frame rate being scalable in accordance with a number of dropped frames depending on whether a previous image has been received, wherein said frame rate is scalable at least in part by dropping at least some frames such that said dropped frames are not sent to said first viewer computer;
receiving an indication to establish a peer-to-peer connection between the broadcaster computer and the first viewer computer, the peer-to-peer connection for passing the image;
routing the image over the peer-to-peer connection instead of the server connections; wherein the one or more serve connections with the application servers are for passing control data for the image; wherein after routing the image over the peer-to-peer connection: receiving a request from a second viewer computer to view the image; in response to receiving the second viewer computer request, reestablishing a first server connection between the broadcaster computer and the first viewer computer for passing the image; and establishing a second server connection between the broadcaster computer and the second viewer computer for passing the image.

8. The method of claim 7, wherein the server connections with the application servers are for passing control data for the image.

9. The method of claim 7, wherein the reestablishing is in response to the broadcaster computer receiving approval from a broadcasting user of the broadcaster computer.

10. The method of claim 9, wherein the user of the second viewer computer is on an approved list.

11. The method of claim 7, further comprising:
maintaining the peer-to-peer connection during existence of the second server connection to the second viewer computer;
detecting termination of the second server connection; and
automatically rerouting the image over the peer-to-peer connection in response to termination of the second server connection.

12. The method of claim 11, wherein the server connections are used for passing instant messages.

13. A method comprising:
receiving a request to initiate one or more server connections between a broadcaster computer and a first viewer computer, the one or more server connections for passing an image and an instant message, the image being communicated at a frame rate and at an image quality, at least one of said frame rate and said image quality being based upon conditions of a communication path between said first user and said second user, said frame rate being scalable in accordance with a number of dropped frames depending on whether a previous image has been received, wherein said frame rate is scalable at least in part by dropping at least some frames such that said dropped frames are not sent to said first viewer computer;
facilitating a peer-to-peer connection between the broadcaster computer and the first viewer computer, the peer-to-peer connection for passing the image;
facilitating communication of an image over the peer-to-peer connection instead of the server connections; and after passing the image from the broadcaster computer to the first viewer computer: passing a request to view the image from a second viewer computer to the broadcaster computer; and facilitating the reestablishing of a first server connection between the broadcaster computer and the first viewer computer for passing the image in response to receiving the second viewer computer request; and facilitating a second server connection between the broadcaster computer and the second viewer computer for passing the image, thereby conserving bandwidth of the servers.

14. The method of claim 13, further comprising:
receiving control data for the image from the broadcaster computer.

15. The method of claim 14, further comprising:
passing an instant message from the broadcaster computer to the first viewer computer.

16. The method of claim 13, wherein the reestablishing is in response to the broadcaster computer receiving approval from a broadcasting user of the broadcaster computer.

17. The method of claim 16, wherein the user of the second viewer computer is on an approved list.

18. The method of claim 13, further comprising:
maintaining the peer-to-peer connection during existence of the server connection to the second viewer computer;
terminating the second server connection; and
facilitating the passing of the image over the peer-to-peer connection in response to termination of the second server connection.

19. The method of claim 18, further comprising:
passing instant messages between the broadcaster computer and the first viewer computer.

* * * * *